(12) United States Patent
Serhan

(10) Patent No.: US 11,537,975 B2
(45) Date of Patent: Dec. 27, 2022

(54) ADAPTIVE COMMODITY DELIVERY DISPATCH

(71) Applicant: Tattle Systems Technology Inc., Saskatoon (CA)

(72) Inventor: Aaron Serhan, Hudson Bay (CA)

(73) Assignee: TATTLE SYSTEMS TECHNOLOGY INC., Saskatoon (CA)

( * ) Notice: Subject to any disclaimer, the term of this patent is extended or adjusted under 35 U.S.C. 154(b) by 618 days.

(21) Appl. No.: 16/549,161

(22) Filed: Aug. 23, 2019

(65) Prior Publication Data

US 2021/0056503 A1    Feb. 25, 2021

(51) Int. Cl.
| | |
|---|---|
| G06Q 30/00 | (2012.01) |
| G06Q 10/08 | (2012.01) |
| G06F 16/29 | (2019.01) |
| H04W 4/029 | (2018.01) |
| G06F 16/23 | (2019.01) |
| H04W 84/18 | (2009.01) |

(52) U.S. Cl.
CPC ..... *G06Q 10/0833* (2013.01); *G06F 16/2379* (2019.01); *G06F 16/29* (2019.01); *H04W 4/029* (2018.02); *H04W 84/18* (2013.01)

(58) Field of Classification Search
CPC ...... G06Q 10/087; G06Q 10/08; G06Q 50/28; G06Q 10/083; G06Q 10/0833; G06Q 10/06315; G06Q 10/0835; G06Q 10/0637; G06Q 2220/10; G06Q 50/30; G07C 2009/0092; G01F 17/00; G01F 22/00; G01F 23/20; G01F 25/0084; G01F 1/74; H04L 67/12
See application file for complete search history.

(56) References Cited

U.S. PATENT DOCUMENTS

2016/0180475 A1* 6/2016 Phillips .............. G06Q 10/0875
                                                                705/7.13
2016/0343124 A1* 11/2016 Sundheimer ............ G01F 22/00

* cited by examiner

*Primary Examiner* — Khalid W Shaheed
(74) *Attorney, Agent, or Firm* — Suiter Swantz pc llo

(57) ABSTRACT

An adaptive dispatch method for the delivery of transportable commodities to or from remote storage containers. at least one remote commodity storage container is associated with a container sensor apparatus capable of measuring the current stored volume of commodity within the container. A plurality of mobile delivery systems is each equipped with a delivery sensor apparatus capable of measuring the delivery volume availability within the system, along with the current geolocation of the system. A server, equipped with a database and a monitoring software component and in communication with the sensor apparatus, detects the existence of delivery conditions at remote containers within the system and then selects a mobile delivery system to dispatch commodity delivery to or from such a container based upon available volume and the closest geographic proximity and initiates a communication to use your device associated with the selected mobile delivery system dispatching the delivery. Hardware and sensor apparatus hardware is also disclosed.

17 Claims, 10 Drawing Sheets

ADAPTIVE COMMODITY DELIVERY DISPATCH

FIELD OF THE INVENTION

This invention is in the field of remote sensor monitoring and more particularly presents hardware, software and methodology for the adaptive dispatch of commodity deliveries to remote locations, between mobile delivery system and potentially mobile delivery locations, using remote sensor apparatus at both ends of the delivery chain with long-term uptime and availability.

BACKGROUND

Many industries including agriculture, petrochemical production and the like have seen increases in the remote staging of stored inputs—liquid and dry supplies and the like are in more cases than ever desired to be stored near their locations of use. As those locations become more distributed however, it is desirable to optimize the delivery schedules to those locations to minimize cost. To optimize delivery schedules to such locations, it is necessary to monitor the state or storage level of different products stored at such locations, so that the timing for the necessity of deliveries to replenish supplies can be properly calculated and deliveries schedule. Just-in-time delivery and pickup schedules require the best data possible, which becomes harder to monitor and to obtain as the logistic lines are geographically extended further and further. To avoid the need for humans to attend and manually capture these readings that particular storage or operation sites it would be desirable to come up with a reliable remote sensing technology which can quickly and efficiently monitor available storage or product at particular locations.

Similarly in extractive or production industries, the storage of extracted or produced products such as oil or gas which needs to eventually be transported—for example in the case of oil wells that are not connected to pipelines or the like—the extracted output also needs to be stored to be monitored for optimized pickup schedules. For example the collection of crude oil extracted from various oil wells and stored on site or in proximity to the wells in staging tanks until tankers can pick up product and transported to a pipeline or to an aggregation point. Again, to optimize the pickup schedules for these products, it would be desirable to have access to automated remote sensing technology which did not require human attendance to sample the contents of storage tanks, storage bins and the like to determine the level of storage remaining in a particular tank, bin or location.

Many existing storage bins, storage tanks and other similar operating environments include pre-existing sensors capable of capturing the necessary information but the information is not captured on a sensor unit which can communicate over long distances to avoid the need for significant manual attendance to either capture the sensor information or to regularly maintain, charge or otherwise attend to the sensor equipment. If it were possible to come up with a long range sensor technology which could address some of the shortcomings in the industry for just-in-time sensor information for scheduled pickup or delivery in such commercial applications, using a piece of technology that could be retrofitted to pre-existing sensors within storage bins, storage tanks and the like, it is felt this would accelerate further the commercial adoption of such technology.

A further shortcoming of current sensor technologies which it is desired to overcome to assist in this just-in-time logistics category is the desire for remote sensing technology on mobile containers—for example to sample available capacity or available product in a moving container such as a trailer or train car or the like. This has heretofore been difficult since typical remote sensing technologies require tethered power supplies, tethered network bandwidth for communication and the like. If it was possible to produce a remote-sensing unit that could communicate over long distances with no tethered network conductivity or tethered power, this would be commercially valuable.

If it were possible to facilitate mobile general technologies which would allow for sampling the remote capacity or remote contents of particular containers such as tanks, storage bins and the like, many types of software or business methodologies could be built upon such data. For example, if it were possible to build a data system which encompassed remote sensor readings which could display the remote sensor readings captured from mobile remote sensors in a mapped format, so data points captured within a particular timeframe could be geographically viewed, this would be useful in some applications. Also, some users may wish to graphically view sensor readings regarding more than one sensor or more than one storage location to plan those optimized delivery schedules the status, and if it were possible to provide such a dataset and data tool is again believed this would be a significant commercial development which would be valuable in industry.

In a more elaborate adaptive dispatch method, it is contemplated that the concept of "virtual pipelines" could also be facilitated, using remotely installed level sensing technology both regarding a receiving commodity storage container and regarding a mobile delivery or system to implement a sophisticated system of adaptive delivery dispatch, matching available commodity requirements and commodity delivery availability.

SUMMARY OF THE INVENTION

The invention consists of the method of adaptive commodity delivery dispatch, for a system comprising several components. The first component of the system used in the method of the present invention is at least one remote commodity storage container, for storage of a transportable commodity. The remote commodity storage container would have a particular capacity volume, being the total amount of commodity which can be stored, and a threshold volume of which it delivery of commodity to or from the commodity storage containers required. Dependent upon the phase and type of the commodity itself, for example if the commodity comprises liquid, gaseous or particulate dry commodities, the specific nature of the remote commodity storage container might vary. Insofar as the system and method of the present invention pertains to an adaptive delivery method and dispatching system for use with the dispatching of deliveries of a particular commodity, it is likely that the specific configuration and type of commodity storage container from the perspective of the type of commodity which can be stored would be the same across the remote commodity storage containers within the system. The specifics of the remote commodity storage containers can vary, while their overall configuration from one container to the next within the system and method in so far as they could contain the same commodity will be understood to be the same.

The capacity volume of the remote commodity storage container, and the threshold volume at which a delivery of commodity might be required are two variables required in performing the method of the present invention. It is necessary to understand the total volume of the remote commodity storage container from the purpose of calculating required dispatch or delivery amounts, and the threshold volume of the container is contemplated to be a threshold level at which it might be desired to trigger a delivery to or from the container. The threshold volume might be a particular volume or might be a percentage of full for example, or different approaches to calculating threshold volume versus total volume will be understood to be within the scope of the present invention.

Besides the at least one remote commodity storage container, the system used in the method would also comprise at least one mobile delivery system, for delivery of the commodity to or from a commodity storage container. The mobile delivery system would comprise a commodity delivery container which has a total delivery volume, being the total volume of commodity which could be transported in the commodity delivery container. The mobile delivery system might comprise a delivery truck, delivery trailer or train car, or several types of delivery vehicles understood to be within the scope of the present invention. It is specifically contemplated that the mobile delivery system could be moved onto the site of at least one remote commodity storage container. The commodity delivery container, similar to the commodity storage containers, could be configured so it would permit the transport of a particular phase or type of commodity to or from remote commodity storage containers. For example, where a liquid or gas commodity was to be transported, the commodity delivery container might be a tank, with the remaining necessary loading or unloading equipment on the mobile delivery system in other cases, if the commodity to be transported and delivered was a particulate solid, a hopper or other type of a trailer or transportable container will be understood to be within the scope of the present invention.

Each remote commodity storage container would be fitted with a container sensor apparatus associated therewith. The container sensor apparatus can capture a measurement of the current storage volume of commodity within the associated remote commodity storage container, and has a network interface capable of communication with the server. The container sensor apparatus would contain the necessary software and hardware measurement interface to allow for the capture of the current storage volume measurement regarding its associated remote commodity storage container. In certain embodiments of the method of the present invention where the remote commodity storage container associated with the container sensor apparatus is mobile, the container sensor apparatus might also include a geo-positioning interface which would allow for a capture of the geolocation of the container sensor apparatus and by extension the associated remote commodity storage container when a measurement of the current storage volume of commodity within the associated container was captured. Container sensor apparatus with or without a geolocation interface will be contemplated for association with various embodiments of the method of the present invention and any necessary additional modifications will be understood to those skilled in the art and are all contemplated within the scope of the present invention.

Besides the container sensor apparatus being associated with each remote commodity storage container, each of the mobile delivery systems of the system of the method would include a delivery sensor apparatus. The delivery sensor apparatus would be capable of capturing the geolocation of the delivery sensor apparatus and the associated mobile delivery system along with the current available volume within the associated delivery system, being the available commodity which was capable to be delivered or received from or to the mobile delivery system in a particular transport dispatch. The delivery sensor apparatus would also include a network interface capable of communication with a server.

The system used with the method of the present invention would also comprise a server which had a processor, and a server network interface capable of communication with the at least one container sensor apparatus, the at least one delivery sensor apparatus, and user devices associated with mobile delivery systems. Additionally, the system would host or be operatively connected to a database comprising at least two types of records, being container records and delivery records. The database would contain a container record corresponding to each remote commodity storage container being administered in the method, which would contain data corresponding to at least the identity of the corresponding container sensor apparatus, the geolocation of the container sensor apparatus and associated remote commodity storage container, the capacity volume, the threshold volume and the current storage volume of the remote commodity storage container. Besides the container records, the database will also include a delivery record corresponding to each mobile delivery system, which contained data corresponding to at least the identity of the corresponding delivery sensor apparatus, the geolocation, and the total delivery volume and current available volume of the mobile delivery system communication coordinates for a user device associated with the mobile delivery system would in many embodiments also be stored. Besides the hardware server and related database, the server would also comprise a monitoring software component capable of carrying out the steps of the method as outlined in the remainder of the specification.

In the execution of the method of the present invention as outlined, the server and the monitoring software component will conduct the monitoring, calculations and dispatch functions as follows. The first step in the method of the present invention, operating in the confines of a system similar to that outlined above, would be the monitoring of the current storage volume within each remote commodity storage container. This would be achieved by receiving at the server via the server network interface container level transmissions from individual container sensor apparatus associated with remote commodity storage containers within the system, each container level transmission comprising a data packet which corresponds to and contains at least the identity of the container sensor apparatus originated the transmission, along with the recently sampled value for the current storage volume within the associated remote commodity storage container. Many types of periodic frequencies or triggering approaches will be understood within the context and scope of the present pension—the container sensor apparatus could for example the program to trigger the generation of a container level transmission of time to periodic frequency, or for example triggered based on a change in the volume level within the associated remote commodity storage container or the like. All such approaches will be understood and contemplated within the scope of the present invention. Sometimes, the periodic container level transmission could also be pulled from the server by polling the container sensor apparatus associated with the particular remote commodity storage container seeking the triggering of a container level transmission.

On receipt of a container level transmission by the server network interface, the monitoring software component and other related components of the server and related software would process that container level transmission by first extracting the sampled value of the current storage volume of the remote commodity storage container, along with the identity of the container sensor apparatus, from the received packet. Following the parsing or extraction of that information from the received packet from the container level transmission, the monitoring software component would identify the relevant container record in the database corresponding to the related storage container, being the target container record, based upon the extracted identity of the container sensor apparatus from which the transmission was received. Finally, the server and the monitoring software component would effect the saving of the extracted current storage volume value from the transmission and the related data packet to the target container record.

In addition to monitoring the current storage volume within each remote commodity storage container, the monitoring software component and the server would also monitor the current available volume within each mobile delivery system by receiving periodic availability transmissions via the server network interface from the individual delivery sensor apparatus associated with individual mobile delivery systems. An availability transmission, received via the server network interface, would comprise a data packet corresponding to at least the identity of the delivery sensor apparatus originating same, and a recently sampled value for the currently available volume within the associated delivery system as well as the geolocation of the delivery sensor apparatus and the associated mobile delivery system.

As outlined regarding the container sensor apparatus, many types of periodic frequencies or triggering approaches will be understood within the context and scope of the present invention and the delivery sensor apparatus associated with each mobile delivery system. The delivery sensor apparatus could for example be programmed to trigger the generation of a availability transmission on a timed periodic frequency, or could also be triggered based on a change in the volume level commodity container associated with the mobile delivery system. All such approaches will be understood and contemplated within the scope of the present invention. Sometimes, the periodic availability transmission can also be pulled by the server, by polling the delivery sensor apparatus associated with a particular mobile delivery system, seeking the triggering of an availability transmission.

On receipt of a availability transmission at the server from a mobile delivery system and its associated delivery sensor apparatus, the monitoring software component and the server would process that availability transmission to update the database and the corresponding delivery record therein with up-to-date information related to the mobile delivery system question. Specifically, the sampled value of the geolocation of the associated mobile delivery system and delivery sensor apparatus would be extracted along with the current available volume of the mobile delivery system, and using the identity of the delivery sensor apparatus from the received packet the delivery record corresponding to the related mobile delivery system, being the target delivery record, could be identified. The geolocation in the current available volume from the transmission would be saved to the target delivery record. In terms of monitoring both the commodity level in the remote commodity storage containers and the mobile delivery systems, the server and the network interface of the server could basically comprise a listener routine as understood to those in the art of computer network design and computer programming in this field capable of receiving the container level transmissions and availability transmissions at the server as they are originated and transmitted from their respective locations.

Besides monitoring the current storage volume within each remote commodity storage container and the current available volume within each mobile delivery system, the monitoring software component would next also detect the existence of a delivery condition in the remote commodity storage containers. A delivery condition would be any volume level within the related remote commodity storage container which required the dispatch of a delivery for commodity to be delivered to or from this remote commodity storage container. The monitoring software component would detect the existence of a delivery condition by monitoring the container records within the database—a delivery condition exists regarding any remote commodity storage container regarding which the current storage volume exceeds the threshold volume.

When a delivery condition is detected to exist regarding at least one remote commodity storage container, the monitoring software component would effect dispatch of a mobile commodity delivery thereto, for each remote commodity storage container at which a delivery condition exists, by first calculating the required delivery quantity of commodity required at this remote commodity storage container by subtracting the current storage volume from the capacity volume. It will be understood that the method of the present invention could be used in both aggregating environments in which commodities or materials produced or extracted at a particular remote site or stored within the remote commodity storage container for eventual take away transport by a mobile delivery system, or where the remote commodity storage containers were staging containers in which delivered inputs or related materials could be stored for consumption or use at a particular remote location. With a take away transport embodiment, the required delivery quantity might relate to the empty volume of the remote commodity storage container i.e. where it was desired to maintain at least a minimum level of emptiness in the container to allow for capacity on site to recover additional products or materials, versus in a delivery scenario the required delivery quantity would more likely relate to the required commodity to be delivered to the container to provide for an additional amount of volume of stored material within the container at the remote location. Both such approaches are contemplated within the scope of the present invention.

Following the calculation of the required delivery quantity, representing the amount of commodity required to be delivered or taken away from a remote commodity storage container at which the threshold volume value has been reached, the monitoring software component would compare the required delivery quantity for the specific remote commodity storage container to the available volume stored in the delivery records for each mobile delivery system, to identify at least one qualified mobile delivery system capable of delivering the required mobile delivery quantity. Effectively, the software would identify a subset of delivery records from the database representing one or more mobile delivery systems which would be capable of singly or in combination making a delivery to this remote commodity storage container. This one or more qualified mobile delivery systems would be the group from which delivery would be selected and dispatched.

Following the identification of a subset of qualified mobile delivery systems from the delivery records in the database, the monitoring software component would then select at least one mobile delivery system and closest geographic proximity to the specific remote commodity storage container requiring the delivery, or at which the delivery condition exists, based upon the geolocation stored in the related container record specific remote commodity storage container and the most recent geo-locations of each qualified mobile delivery system stored in the related delivery records. Effectively, the monitoring software component would select at least one mobile delivery system from the identified qualified mobile delivery systems, which system either singly or combined with others in the closest geographic proximity to the location at which the delivery with required and had sufficient available volume to permit the completion of the required delivery of commodity to or from this remote commodity storage container.

The final step in this basic embodiment of the method of the present invention would be the transmission of the dispatch notification regarding the at least one selected delivery system, to the communication coordinates of the user device associated with the delivery record for the selected delivery system from the database, facilitated by the monitoring software component and the remainder of the components and network interface of the server. Effectively, a dispatch notification would be transmitted to the user device of the user associated with the mobile delivery system in question, which dispatch notification would include the details of the location to which delivery was to be made, required delivery quantity etc. The method of the present invention is adaptive insofar as the mobile delivery system selected for a delivery of commodity to or from a particular remote commodity storage container would be dictated by selecting at least one selected delivery system which could make the required delivery based upon the available amount of commodity or commodity space within the transport container associated with the delivery system, and the delivery system being selected being in the closest geographic proximity to the remote commodity storage container requiring the delivery, at which the delivery condition exists. It will be understood that additional parameters can also be incorporated into the selection methodology, whereby additional parameters besides geographic proximity could narrow down the subset of qualified mobile delivery systems in any number of additional such modifications as understood to those skilled in the art are all contemplated within the scope of the present invention.

Two different types of remote commodity storage containers are contemplated. In certain embodiments of the method of the present invention the remote commodity storage containers would be aggregation containers in which on-site commodity production would be stored, and the commodity delivery required involves transporting commodity from the remote commodity storage container by a selected mobile delivery system for take away from the container, and the second type of a remote commodity storage containers a supply container in which commodity supply is stored for on-site consumption or use, and commodity delivery required involves transporting commodity to the remote commodity storage container by selected mobile delivery system for delivery to the container. Both such types of containers are contemplated within the scope of the present invention. It will also even be understood that in certain embodiments of the system and method of the present invention, where the commodity itself was the same, some of the remote commodity storage containers could be aggregation containers, and other remote commodity storage containers could be supply containers.

The method of the present invention could be practised using one or more remote commodity storage containers. It is specifically contemplated that a plurality of mobile delivery systems would be used in embodiments of the present invention, to maximize the adaptive nature of the method based upon the selection of the mobile delivery system at the closest geographic location to a remote commodity storage container delivery.

It is specifically contemplated that in many embodiments of the present invention, the selected delivery apparatus selected to be dispatched for delivery of transported commodity to or from a particular remote commodity storage container would be a single selected delivery apparatus. In other embodiments however, the monitoring software component could select a plurality of selected delivery apparatus to effect a delivery to a commodity storage container under a delivery condition, where there was not a single qualified delivery apparatus having the available volume to deliver the required amount to this remote commodity storage container. Both such approaches—namely the dispatch of a single selected delivery apparatus or a plurality of remote commodity storage container for delivery to a particular remote commodity storage container under delivery condition are both contemplated within the scope of the present invention.

The method of the present invention can be practised regarding the delivery of commodities of various types and phases to particular remote commodity storage containers. It is specifically contemplated that the actual stored commodity for storage and transport to or from a particular grouping of remote commodity storage containers could be a liquid, a gas or a flowable or particulate solid, and the necessary adjustments to the container sensor apparatus of these remote commodity storage containers and to mobile delivery systems and the delivery sensor apparatus associated therewith will all be understood to be within the scope of the present invention.

The container sensor apparatus associated with at least one remote commodity storage container could be self-contained insofar as it would include a self-contained long-term power supply which did not require external power input. This would allow for the use of the container sensor apparatus of the method and system of the invention with remote commodity storage containers in extremely remote and off grid locations. It is specifically contemplated that the self-contained long-term power supply could be a battery with the solar charging system. In other embodiments, the container sensor apparatus could be connected to an external power bus.

Similarly, the delivery sensor apparatus used in the system and method of the present invention could also incorporate a self-contained long-term power supply which did not require external power input. This would allow for the rapid retrofit of the delivery sensor apparatus of the present invention to pre-existing mobile delivery systems. Again however, other mobile delivery systems such as delivery trucks, trains or other modes of transportation might include a power bus to which the delivery sensor apparatus of the present invention can be connected in both such approaches are contemplated within the scope.

Insofar as the delivery sensor apparatus as outlined herein includes a geolocation module or capability, allowing for the capture of current geolocation of the delivery sensor apparatus and associated mobile delivery system at any time, in certain embodiments of the present invention the remote commodity storage containers could also be mobile, which would be facilitated by the associated container sensor apparatus for a mobile remote commodity storage container also including a geolocation capability allowing for the capture of geolocation of the container sensor apparatus and the associated when a sensor readings captured for the generation of a transmission to the server. The sensor captured by the related container sensor apparatus and subsequent container level transmission would include the current capture information of the geolocation of the remote commodity storage container in those cases, and the geolocation of the corresponding container record would be updated during the extraction and storage of the contents of the container level transmission. Both such approaches, namely that of a fixed geolocation stored within the container record, or an adjustable geolocation being updated occasionally are contemplated within the scope of the present invention.

The network interface of either the container sensor apparatus or the delivery sensor apparatus is explicitly contemplated to potentially be a cellular modem connected to a cellular data network capable of communication with the server via the server network interface. Several types of networks and network topologies can be contemplated within the scope of the present invention.

In certain embodiments of the method of the present invention, the container level transmissions transmitted from container sensor apparatus could include timestamps of the related sensor capture contained, and the database on the related container record structure associated therewith could be adapted to store multiple current stored volume values along with the related timestamps regarding the related remote commodity storage container. This would allow the monitoring software component to predictably determine the existence of a delivery condition at a particular time regarding a particular remote commodity storage container based upon predicting the current storage volume value in the container based upon the time and stored volume curve established by multiple previously captured timestamp and volume combinations or values.

Besides the method embodiments of the present invention there is also disclosed a server for a method of adaptive commodity delivery dispatch regarding at least one remote commodity storage container for the storage of a transportable commodity, which commodity storage container has a capacity volume being the total amount of commodity which can be stored in the commodity storage container as well as a threshold volume at which a delivery of commodity to or from the commodity storage container might be required. That method also incorporates reliance upon at least one mobile delivery system for the delivery of the commodity to or from a commodity storage container, which mobile delivery system comprises a commodity delivery container having a total delivery volume being the total volume commodity which can be transported in the commodity delivery container.

The server comprises a processor and a server network interface capable of communication with the container sensor apparatus associated with each remote commodity storage container, which container sensor apparatus can capture the current stored volume of commodity within the associated commodity storage container. The server network interface is also capable of communication with the delivery sensor apparatus associated with each mobile delivery system, which delivery sensor apparatus can capture the geolocation thereof and the current available volume within the associated mobile delivery system. Finally, the server network interface would also be capable of vacation with user devices associated with the mobile delivery systems.

The server also comprises a database which includes container records corresponding to each remote commodity storage container and containing data corresponding to lease the identity of the corresponding container sensor apparatus and the geolocation, the capacity volume, the threshold volume in the current stored volume of this remote storage container. The database would also include delivery records corresponding to each mobile delivery system, and which would contain data corresponding to at least the identity of the corresponding delivery sensor apparatus, the current geolocation of the mobile delivery system along with the total delivery volume of the current available volume of the mobile delivery system. The delivery record would also include communication coordinates for a user device associated therewith.

The server would host processor instructions comprising a monitoring software component for carrying out the steps of the method, by:

1. monitoring the current stored volume within each remote commodity storage container by receiving periodic container level transmissions via the server network interface from individual container sensor apparatus, each container level transmission comprising a data packet corresponding to at least the identity of the container sensor apparatus and a recently sampled value for the current stored volume within the associated remote storage container and on receipt of any periodic container level transmission:
    a. extracting the sampled value of the current stored volume of the remote storage container and the identity of the container sensor apparatus from the received packet;
    b. identifying the container record corresponding to the related remote storage container, being the target container record, based on the extracted identity of the container sensor apparatus from which the transmission was received; and
    c. saving the extracted current stored volume value from the transmission to the target container record;
2. monitoring the current available volume within each mobile delivery system by receiving periodic availability transmissions via the server network interface from individual delivery sensor apparatus, each availability transmission comprising a data packet corresponding to at least the identity of the identity of the delivery sensor apparatus and a recently sampled value for the current available volume within the associated mobile delivery system and on receipt of any periodic availability transmission:
    a. extracting the sampled value of the geolocation, the current available volume of the mobile delivery system and the identity of the delivery sensor apparatus from the received packet;
    b. identifying the delivery record corresponding to the related mobile delivery system, being the target delivery record, based on the extracted identity of the delivery sensor apparatus from which the transmission was received; and
    c. saving the geolocation and the current available volume from the transmission to the target delivery record;
3. detecting the existence of a delivery condition at any of the remote storage containers by monitoring the container records in the database, wherein a delivery condition exists regarding any remote storage container regarding which the current stored volume exceeds the threshold volume; and 4. on detection of a delivery condition in respect of any specific remote storage container, dispatching a mobile commodity delivery thereto by:
   a. calculating the required delivery quantity of commodity required by subtracting the current stored volume from the capacity volume;
   b. comparing the required delivery quantity for the specific remote storage container to the available volume stored in the delivery records for each mobile delivery system, to identify at least one qualified mobile delivery system capable of delivering the required mobile delivery quantity;
   c. selecting at least one mobile delivery system in closest geographic proximity to the specific remote storage container based upon the geolocation stored in the related container record and the most recent geolocations of each qualified mobile delivery system stored in the related delivery records, being the selected delivery apparatus; and
   d. transmitting a dispatch notification regarding the selected delivery apparatus to the communication coordinates of the user device associated with the delivery record of the selected delivery apparatus.

The server would comprise any combination of hardware and software as outlined above that would allow for the execution of adaptive commodity dispatch method outlined in any embodiment outlined.

The server could be used in the execution of a method where the remote commodity storage containers are aggregation containers, in which on-site commodity production is stored, and the commodity delivery required involves transporting commodity from the remote commodity storage container by a selected mobile delivery system for takeaway from the container, or wherein the remote commodity storage containers are supply containers in which commodity supply is stored for on-site consumption, and the commodity delivery required involves transporting commodity to the remote commodity storage container by a selected mobile delivery system for delivery to the container.

The server network interface would comprise any necessary combination of software and hardware facilitate the communication the external hardware modules outlined above, namely container sensor apparatus, the delivery sensor apparatus and the user devices.

The invention also comprises a monitoring software component for use on a server in the execution of a method of adaptive commodity delivery dispatch regarding at least one remote commodity storage container for storage of a transportable commodity, said commodity storage container having a capacity volume being the total amount of commodity which can be stored in the commodity storage container and a threshold volume at which a delivery of commodity to or from the commodity storage container is required, and at least one mobile delivery system for delivery of the commodity to or from a commodity storage container, said mobile delivery system comprising a commodity delivery container having a total delivery volume being the total volume of commodity which can be transported in the commodity delivery container. The server comprises a processor and a server network interface capable of communication with the container sensor apparatus associated with each remote commodity storage container, which container sensor apparatus can capture the current stored volume of commodity within the associated commodity storage container. The server network interface is also capable of communication with the delivery sensor apparatus associated with each mobile delivery system, which delivery sensor apparatus can capture the geolocation thereof and the current available volume within the associated mobile delivery system. Finally, the server network interface would also be capable of communication with user devices associated with the mobile delivery systems. The server also comprises a database which includes container records corresponding to each remote commodity storage container and containing data corresponding to lease the identity of the corresponding container sensor apparatus and the geolocation, the capacity volume, the threshold volume in the current stored volume of this remote storage container. The database would also include delivery records corresponding to each mobile delivery system, and which would contain data corresponding to at least the identity of the corresponding delivery sensor apparatus, the current geolocation of the mobile delivery system along with the total delivery volume of the current available volume of the mobile delivery system. The delivery record would also include communication coordinates for a user device associated therewith.

The monitoring software component would comprise processor instructions executable on the server for carrying out the steps of the method, by:
1. monitoring the current stored volume within each remote commodity storage container by receiving periodic container level transmissions via the server network interface from individual container sensor apparatus, each container level transmission comprising a data packet corresponding to at least the identity of the container sensor apparatus and a recently sampled value for the current stored volume within the associated remote storage container and on receipt of any periodic container level transmission:
   a. extracting the sampled value of the current stored volume of the remote storage container and the identity of the container sensor apparatus from the received packet;
   b. identifying the container record corresponding to the related remote storage container, being the target container record, based on the extracted identity of the container sensor apparatus from which the transmission was received; and
   c. saving the extracted current stored volume value from the transmission to the target container record;
2. monitoring the current available volume within each mobile delivery system by receiving periodic availability transmissions via the server network interface from individual delivery sensor apparatus, each availability transmission comprising a data packet corresponding to at least the identity of the identity of the delivery sensor apparatus and a recently sampled value for the current available volume within the associated mobile delivery system and on receipt of any periodic availability transmission:
   a. extracting the sampled value of the geolocation, the current available volume of the mobile delivery system and the identity of the delivery sensor apparatus from the received packet;
   b. identifying the delivery record corresponding to the related mobile delivery system, being the target delivery record, based on the extracted identity of the delivery sensor apparatus from which the transmission was received; and
   c. saving the geolocation and the current available volume from the transmission to the target delivery record;
3. detecting the existence of a delivery condition at any of the remote storage containers by monitoring the container records in the database, wherein a delivery condition exists regarding any remote storage container regarding which the current stored volume exceeds the threshold volume; and 4. on detection of the existence of a delivery condition in respect of any specific remote storage container, dispatching a mobile commodity delivery thereto by:
   a. calculating the required delivery quantity of commodity required by subtracting the current stored volume from the capacity volume;
   b. comparing the required delivery quantity for the specific remote storage container to the available volume stored in the delivery records for each mobile delivery system, to identify at least one qualified mobile delivery system capable of delivering the required mobile delivery quantity;
   c. selecting at least one mobile delivery system in closest geographic proximity to the specific remote storage container based upon the geolocation stored in the related container record and the most recent geolocations of each qualified mobile delivery system stored in the related delivery records, being the selected delivery apparatus; and
   d. transmitting a dispatch notification regarding the selected delivery apparatus to the communication coordinates of the user device associated with the delivery record of the selected delivery apparatus.

The monitoring software component could execute the steps in many variants of the method of the present invention including any outlined above and herein, including those with variable numbers of selected delivery apparatus. Any monitoring software component facilitating the execution by the server of the present invention of the steps to execute the method outlined elsewhere in this specification are all contemplated within the scope of the present invention.

Certain embodiments of the method envision at least one remote commodity storage container being mobile with the associated container sensor apparatus be capable of capturing its geolocation, and the monitoring software component in such an embodiment could receive and process or facilitate use of the geolocation of the container sensor apparatus for storage in the related container record of the database.

In certain embodiments of the present invention the database and the container records would be structured to facilitate the repeated storage or capture of the results of container level transmissions from various container sensor apparatus, along with timestamps thereof, to allow for the rendering of a time correlated volume curve allowing for the predictive determination of the existence of a delivery condition at a particular remote commodity storage container. Any necessary adjustments to the software of the present invention to accommodate such a data structure and an adaptive or predictive method of determination of the existence of delivery conditions at remote commodity storage containers are all contemplated within the scope of the invention.

It will also be understood that the monitoring software component would be capable of the execution of various geographic information system type functions i.e. the determination of geographic proximity of the geolocations of particular remote commodity storage containers and particular mobile delivery systems. Incorporation of such GIS or geographic functionality to the monitoring software component or components, or the facilitation of an interface with a third-parry GIS component to achieve these results, will again all be understood to be within the scope of the present invention.

Also disclosed is a container sensor apparatus for use in in association with a remote commodity storage container in a use in a method of adaptive commodity delivery dispatch regarding a transportable commodity, said commodity storage container having a capacity volume being the total amount of commodity which can be stored in the commodity storage container and a threshold volume at which a delivery of commodity to or from the commodity storage container is required, said container sensor apparatus comprising a processor; a local volume sensor capable of capturing the current stored volume in the associated remote storage container; a network interface; and a sensing software component capable of capturing the current stored volume of commodity within the associated remote commodity storage container. The container sensor apparatus of the present invention and the related sensing software component are capable of participation in the adaptive dispatch method of the present invention by, on a periodic basis:
   a. capturing the current stored volume in the associated container from the local volume sensor;
   b. assembling a data packet for transmission to a remote server, said data packet containing a network address or other identity of the container sensor apparatus and the captured current stored volume in the container; and
   c. transmitting a container level transmission containing the data packet to the server;

wherein upon receipt of the container level transmission at the server that transmission and the data encapsulated therein is processed under the remainder of the method of the present invention.

The container sensor apparatus could have various types of local volume sensors associated therewith dependent upon the type or phase of the particular stored commodity regarding which it was desired to measure volume within a container.

In certain embodiments of the container sensor apparatus of the present invention an external power supply would be connected, and in other embodiments, the container sensor apparatus would incorporate a self-contained long-term power supply not requiring external power input.

Some embodiments of the container sensor apparatus could also include the hardware and software to provide a geo-capture function by which the current geolocation of the container sensor apparatus could be captured for use in a container level transmission. This is specifically contemplated to have utility where a particular remote commodity storage container was mobile and it was desired to always store the current geolocation of the container along with its volume levels in the database.

In most embodiments the network interface of the container sensor apparatus would be a cellular modem connected to a cellular data network, capable of communicating with the server network interface. In other instances the network interface of the container sensor apparatus could rely upon different networks are networked apologies for communication.

Also disclosed is a delivery sensor apparatus for use in in association with a mobile delivery system in a use in a method of adaptive commodity delivery dispatch regarding a transportable commodity, said mobile delivery apparatus comprising a commodity delivery container having a total delivery volume being the total volume of commodity which can be transported in the commodity delivery container, said delivery sensor apparatus comprising a processor; local availability sensors capable of capturing the geolocation and the current available volume within the associated mobile delivery system; a network interface; and an availability software component. The availability software component can participate in the method by on a periodic basis:
  a. capturing the current geolocation and current available volume in the associated mobile delivery system from the local volume sensor;
  b. assembling a data packet for transmission to a remote server, said data packet containing a network address or other identity of the delivery sensor apparatus and the captured geolocation and current available volume; and
  c. transmitting a availability transmission containing the data packet to the server.

Upon receipt of the availability transmission at the server that transmission and the data encapsulated therein is processed under the remainder of the method of the present invention.

The delivery sensor apparatus could have various types of local volume sensors associated therewith dependent upon the type or phase of the particular stored commodity regarding which it was desired to measure volume within a container.

In certain embodiments of the delivery sensor apparatus of the present invention an external power supply would be connected, and in other embodiments, the container sensor apparatus would incorporate a self-contained long-term power supply not requiring external power input.

In most embodiments the network interface of the container sensor apparatus would be a cellular modem connected to a cellular data network, capable of communicating with the server network interface. In other instances the network interface of the container sensor apparatus could rely upon different networks are networked apologies for communication.

The container sensor apparatus and the delivery sensor apparatus could both be the same type of hardware used for both purposes this use of a consolidated sensor apparatus would yield the most simplified deployment of the method. A consolidated sensor apparatus and its necessary hardware and software components are outlined and claimed.

DESCRIPTION OF THE DRAWINGS

While the invention is claimed in the concluding portions, preferred embodiments are provided in the detailed description which may be best understood with the diagrams where like parts in each of the several diagrams are labeled with like numerals, and where:

DETAILED DESCRIPTION OF ILLUSTRATED EMBODIMENTS

Figure 1:
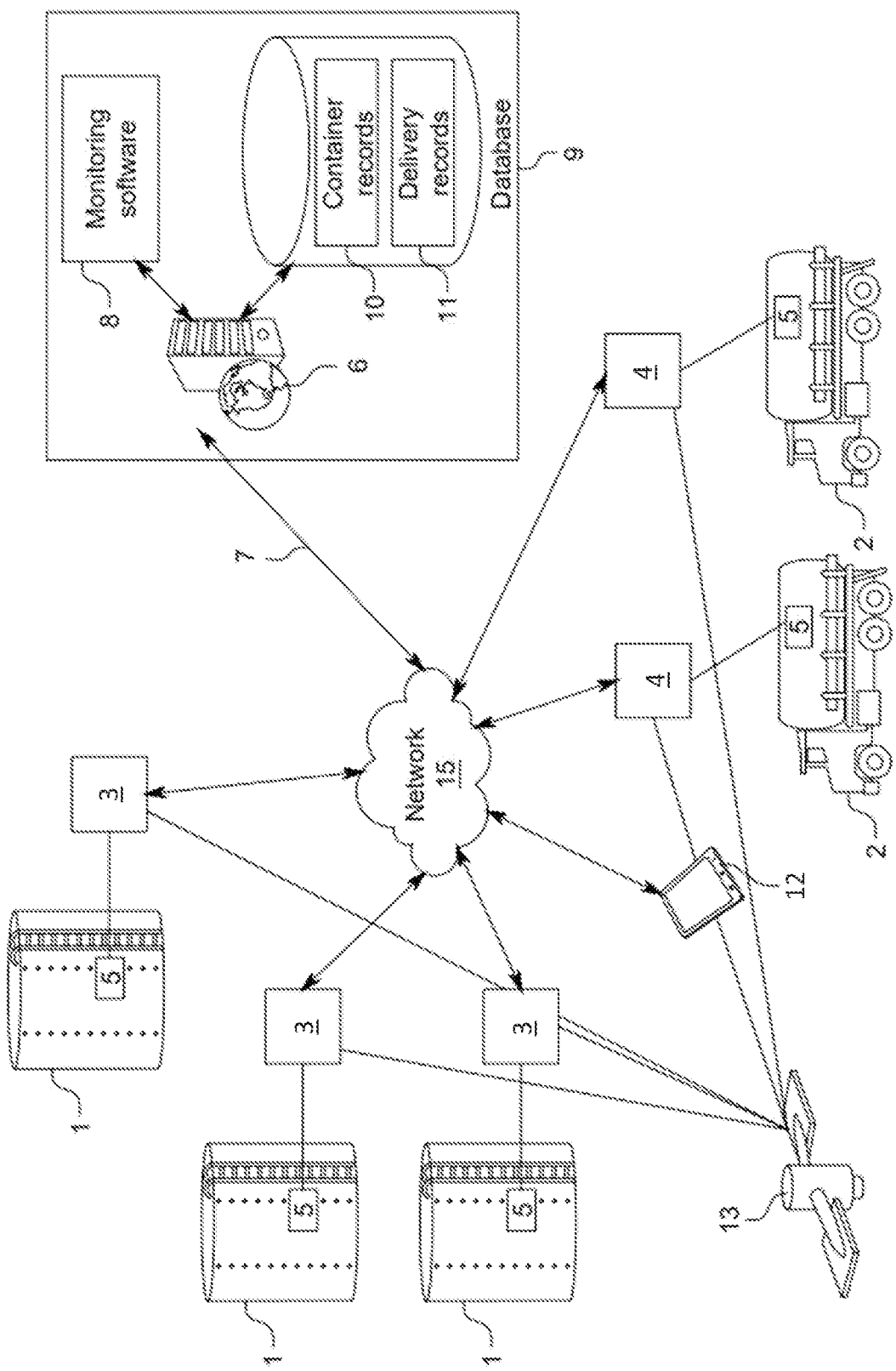
FIG. 1 is a block diagram showing the components of one embodiment of a system under the present invention.

As outlined above it is the object of the present invention to provide a method and related online software for the adaptive dispatch of commodity deliveries to remote commodity capture or consumption locations. The following provides additional background and information, to appreciate the functionality of the invention it is beneficial to also establish certain terminology and context in relation to the remainder of the specification to describe the invention.

Commodity Types:

As outlined, the present invention comprises a method and related hardware for the execution of an adaptive dispatch method for the delivery of transportable commodities to or from remote commodity storage locations. Many types of commodities are contemplated to be within the foreseeable scope of the method of the present invention—basically any type of a commodity which in a storage container or delivery container can be volumetrically measured.

Many formats of commodities which could be measured, transported and transloaded between delivery and storage containers could be encompassed by the method of the present invention—for example commodities of various phases or types could be envisioned—including liquids, gases or flowable or particulate solids. Any type of a commodity which could be volumetrically contained within a delivery container or a remote commodity storage container and the volume of which within the delivery and storage containers can be measured using a volume sensor or some other type of a sensor method yielding a volumetric measurement result are all contemplated within the scope of the present invention.

The method of the present invention can be practised with multiple types of commodities. It may even be the case that certain mobile delivery systems would allow for the transport of multiple commodities on a single mobile delivery platform. It is contemplated that the method of the present invention as outlined herein is outlined for practice regarding individual commodities, but the method of the present invention could also be practised with mobile delivery systems transporting multiple commodities to multiple types of remote commodity storage containers. Any such modification expansion of the method of the present invention to encompass multiple commodities within a single overarching system or method embodiment will be understood to be within the scope of the present invention.

Container Types:

Many types of containers could be used to volumetrically contain a commodity at a remote storage site or on a mobile delivery system. A remote commodity storage container, or the delivery container on a mobile delivery system, comprise a bin, a tank or the like—any type of a container which could contain a commodity which could be volumetrically measured—is contemplated within the scope of the present invention. It is specifically contemplated that in the context of liquid or gaseous phase commodities being dispatched within the adaptive dispatch method of the present invention that both the remote commodity storage containers and the transport container on the mobile delivery systems would be one or more tanks. With flowable solids or particulate solids, tanks or bins or the like could be used.

It is also specifically contemplated that the remote commodity storage containers used, insofar as they are associated with other equipment at their remote storage site or location, could either be in the category of what is referred to as aggregation containers, or storage containers. An aggregation container should denominate a container to store produced or extracted commodity at the remote location in question. For example, a factory which is yielding a production volume of a particular commodity—the container or containers used to contain the production volume of a commodity for take away from that location for distribution or further processing etc., or in an extractive context remote commodity storage containers might aggregate oil or gas products extracted and aggregated for subsequent take away transport where the particular oil and gas locations are not connected by pipeline. With an aggregation container, the dispatch and transport of commodity required will typically be the dispatch of mobile delivery systems having take away capacity to transport commodity away from the particular remote commodity storage container.

Rather than aggregation or take away containers, the second category of containers contemplated to be within the scope of the adaptive dispatch method of the present invention are storage containers at remote storage locations. These would be tanks, bins or other storage containers containing transportable commodities in association with the remainder of the invention consumed at their storage location i.e. the stored quantity of commodity within the remote commodity storage container would decrease as consumed, versus the stored quantity of commodity within an aggregation container as outlined above increasing as produced. Again it is contemplated that in both such cases the adaptive dispatch method of the present invention can be used—with aggregation container to dispatch mobile delivery systems with available take away transport volume, and with storage containers to dispatch mobile delivery systems with available volume stored therein for delivery to a remote storage container requiring same.

Sensor Types:

As outlined throughout, the adaptive dispatch method of the present invention depends upon sensor apparatus regarding both the remote commodity storage containers and the mobile delivery systems encompassed by the system and method of the present invention all having a sensor apparatus associated therewith capable of yielding a measurement of the available delivery commodity quantity, or the current storage volume within a remote storage container. The sensors used could either be integrated or hardwired to the remainder of the sensor apparatus of the present invention, or a sensor apparatus could also be developed provide a sensor interface or box allowing for the connection of the sensor interface to a preinstalled sensor on either a remote commodity storage container or a mobile delivery system. Both such approaches are contemplated within the scope of the present invention.

Different sensors could sense the available quantity or the full or empty volume of commodity within a particular container. Some sensors which could be used under the remainder of the present invention would directly yield a volume based reading, and in other circumstances, different sensors which could capture particular parameters or measurements regarding a volume of commodity stored within a delivery or storage container which could be mathematically converted into a volumetric calculated result are all contemplated within the scope of the present invention.

System Overview:

Referring to FIG. 1 there is shown a schematic diagram of one embodiment of a system under the remainder of the specification and present invention, to demonstrate the operation of the method and related hardware.

As outlined, the adaptive dispatch method of the present invention is practised regarding at least one remote commodity storage container 1 at a remote storage location. The remote commodity storage containers 1 each can store a volume of the transportable commodity at their remote location. In this Figure, three remote commodity storage containers 1 are shown—it will be understood that the method of the present invention could be practised with anywhere from one to infinity number of remote commodity storage containers 1 configured or interfaced with sensor apparatus and the remainder of the system and method of the present invention.

Besides the three remote commodity storage containers 1 there are shown two mobile delivery systems 2. The mobile delivery systems 2 are any type of a mobile transport unit capable of transporting the commodity being stored in the remote commodity storage containers 1, for delivery to or from the remote commodity storage containers 1. The mobile delivery systems 2 shown are two tank trucks. It will be understood that several types of mobile delivery systems 2 if they were capable of travel and mobile arrival at the remote locations of the remote commodity storage containers 1 are all contemplated within the scope of the present invention.

Each of the remote commodity storage containers 1 has a container sensor apparatus 3. The container sensor apparatus 3, as outlined in further detail herein, is a sensor hardware interface, connected to one or more sensors 5 within the tank or other container 1 to measure the current storage volume within the container 1. Each of the container sensor apparatus 3 also includes a network interface capable of communicating with a server 6 via the network shown at 15. The container sensor apparatus 3 is also locationally aware, having the ability to capture a geolocation of the sensor apparatus 3 and by inference the associated remote commodity storage container 1 at any time and particularly when network transmissions of sensor readings are originated. A satellite is shown at 13 to simply demonstrate the potential for GPS or other similar systems to support the locational awareness aspect of the container sensor apparatus 3 as shown. In some embodiments, the container sensor apparatus 3 may not be locationally aware and the geolocation of the particular related remote commodity storage container 1 may be hardcoded into the container record 10 of the database 9 pertaining to that container 1—both such approaches are contemplated within the scope.

Each of the mobile delivery systems 2 is shown having a delivery sensor apparatus 4. The delivery sensor apparatus 4 is a hardware sensor apparatus again either hardwired to a sensor 5 on the mobile delivery system 2, or connected to a pre-existing sensor via a sensor interface. Again, the delivery sensor apparatus 4 are also shown in connection with the network 15 for communication with the server 6, and shown again in communication with the locational network 13 by which the geolocation of the mobile delivery system 2 can be captured in the process of generation of a location and volume transmission to the server 6. Details of the operation of the container sensor apparatus 1 and the delivery sensor apparatus 4 are outlined in further detail below.

Also shown is a user device 12 connected to the network 15. The user device 12 would be the device of an operator or user of one or more of the mobile delivery systems 2 via which the user or operator could receive dispatch instructions from the server 6 under the remainder of the adaptive dispatch method of the present invention. The server 6 as shown as a network interface 7 capable of participating occasion with the user devices 12 associated with the mobile delivery systems 2, the delivery sensor apparatus 4 and the container sensor apparatus 3.

The hardware and software used to facilitate the execution of the adaptive dispatch method of the present invention comprises a server 6, being a typical hardware device with the processor and other components. The server would contain processor instructions comprising a monitoring software component 8 for the execution of the steps of the method of the present invention and a database 9. Database 9 comprises at least a plurality of container records 10 each corresponding to a remote commodity storage container 1, and a plurality of delivery records 11 each corresponding to a mobile delivery system. The data structure of the records in the database 9 are outlined in further detail below.

Remote Commodity Storage Container:

As outlined above both regarding commodities which could be stored and dispatched within the context of the remainder of the adaptive dispatch method of the present invention and with specific reference to the remote commodity storage container 1 disclosed in FIG. 1 et al., the remote commodity storage containers 1 could comprise any type of a container capable of containing a particular transportable commodity at a remote location, regarding which the dispatch for transport to or from the remote commodity storage container 1 of this commodity might be required. Many types of remote commodity storage containers 1 will be conceivable dependent upon the commodity to be stored and transported. The remote commodity storage container 1 may also include on the ground additional loading and unloading equipment, conduits or other items as required to allow for the loading or unloading of the transportable commodity to or from the container as dispatched under the method.

There are several key variables tracked in the container record 10 corresponding to a particular remote commodity storage container 1. These will include the identity of the corresponding container sensor apparatus 3—which might effectively comprise the network address of the corresponding container sensor apparatus and or other identifying information which could identify and correlate sensor transmissions regarding the container 1 associated therewith when transmitted back to the server 6. Besides the identity of the associated container sensor apparatus 3, the system and method of the present invention will require the tracking of the geolocation of the particular remote commodity storage container 1. Where the associated container sensor apparatus 3 was not locationally aware, the geolocation of the particular remote commodity storage container 1 could be hardcoded into this container record 10. In other cases, where the associated container sensor apparatus 3 was locationally aware, and particularly if the container sensor apparatus 3 on the delivery sensor apparatus 4 were identical consolidated sensor apparatus, the geolocation of the container sensor apparatus 3 and the associated boat commodity storage container 1 could be updated in the container record 10 along with updating current storage volume values when a current level transmission was received at the server 6. This would be of particular interest where one or more of the remote commodity storage containers 1 was also mobile, so the current geolocation of the container 1 was required for the purpose of the execution of the remainder of the adaptive dispatch method of the present invention.

Besides the geolocation and the identity of the container sensor apparatus 3 the container record would also include data corresponding to the capacity volume of the related container 1, the threshold volume of the container 1 which is the volume at which a delivery condition is determined to exist and at which volumetric level or point in time it is necessary to request the dispatch of a transport of commodity to or from the container 1. Finally, the container record 10 would also include the current stored volume of the associated body storage container 1 sampled occasionally by the associated sensor 5 and container sensor apparatus 3.

The remote commodity storage container 1 as outlined in further detail above would have at least one sensor connected to an associated container sensor apparatus 3, by which ongoing the container sensor apparatus 3 could sample the current storage volume within the container 1 to ascertain whether or not the volume stored in the container 1 of the current time exceeded the threshold volume value stored regarding that container 1 in the database 9 so a delivery condition existed regarding that container 1.

The remote commodity storage containers 1 shown in FIG. 1 are all stationary tanks. It will be understood however that if the container sensor apparatus 3 was locationally aware, the remote commodity storage containers 1 could be mobile and could be additional trucks or trains or other storage units that can be moved temporarily or because I permanently to particular locations. Both such approaches are contemplated within the scope of the present invention.

Mobile Delivery System:

Two mobile delivery systems 2 are shown in the embodiment of FIG. 1. The systems 2 as shown are tank trucks which would be capable of transporting fluid commodities, although as outlined exhaustively herein different mobile transport units could also be used, capable of hauling different types and phases of commodities including liquids, gases, particulates or solids etc. The mobile delivery systems 2 as shown each consist of a commodity delivery container, namely a tank. Each mobile delivery system 2 is associated and interfaced physically with a delivery sensor apparatus 4, which includes either a connection to a pre-existing sensor 5 on the system 2, or an integrated or OEM connected sensor 5, capable of rendering a measurement of the current stored volume of commodity within the commodity delivery container and available on the system 2 for delivery to or from a container 1. The sensor 5 could be a volume measurement sensor that could capture a direct measurement of the available commodity storage capacity within the commodity delivery container, or in other embodiments, different sensors 5 which could capture sensor readings which could be converted mathematically by the software on the delivery sensor apparatus 4 or the server 6 to yield the available storage volume value for storage in the related delivery record 11.

There are several key variables tracked in the delivery record 11 corresponding to a particular mobile delivery system 2. These would include the identity of the corresponding delivery sensor apparatus 4—which might effectively comprise the network address of the corresponding delivery sensor apparatus 4 or other identifying information which could identify and correlate sensor transmissions regarding the mobile delivery system 2 associated therewith when transmitted back to the server 6. Besides the identity of the associated delivery sensor apparatus 4, the system and method of the present invention requires the tracking of the geolocation of the particular mobile delivery system 2—the associated delivery sensor apparatus 4 would be locationally aware and capable of capturing a GPS snap or other geolocation coordinates of the delivery sensor apparatus 4 and by inference the associated mobile delivery system 2. The up-to-date geolocation of the delivery sensor apparatus 4 would be stored in the corresponding delivery record 11 along with the identity information for the hardware.

Besides the identity and geolocation of the sensor apparatus and associated mobile delivery system, the delivery record 11 would also include data corresponding to the current available volume available on the mobile delivery system 2 for delivery to or from a particular remote commodity storage container 1.

The mobile delivery system 2 as outlined in further detail herein would have at least one sensor connected to the associated delivery sensor apparatus 4, by which on an ongoing basis the delivery sensor apparatus could sample the current available volume to ascertain the available volume for delivery to or from a particular container 1.

Container Sensor Apparatus:

As outlined, each remote commodity storage container 1 would be associated with a container sensor apparatus 3, which has at least one sensor associated therewith for periodically sampling the stored volume of commodity within the container 1. The container sensor apparatus effectively comprises a hardware and software combination, connected either to an integrated or wired sensor or sensors permitting the measurement of the stored volume of commodity within the associated remote commodity storage container 1, or comprising the hardware and software combination with the sensor bus or connection capable of connection to pre-existing sensors in relation to the container 1.

In basic embodiments of the method of the present invention, the container sensor apparatus 3 would not be locationally aware and would not send the geolocation of the container or the sensor apparatus to the server along with a current volume transmission. In other embodiments of the method, and embodiments most likely to be implemented, particularly where the container sensor apparatus 3 is the same as the delivery sensor apparatus 4, the hardware of the container sensor apparatus 3 would also be locationally aware and the Ardmore and software combination could be modified to permit the capture of the geolocation of the device when the transmission to the server is made.

Delivery Sensor Apparatus:

Each mobile delivery system 2 would be associated with a delivery sensor apparatus 4 which has at least one sensor 5 associated therewith for periodically sampling the available volume of commodity within the associated mobile delivery system 2. The delivery sensor apparatus 4 effectively comprises a hardware and software combination having a GPS or some other type of a location awareness interface so the geolocation can be determined from time to time, and a connection either to an integrated or wired sensor or sensors permitting the measurement of the available volume commodity storage within the associated mobile delivery system 2, or comprising the hardware and software combination with a sensor bus for connection capable of connection to pre-existing sensors 5 in relation to the system 2 rather than hardwired or OEM sensor equipment.

It is particularly contemplated that the same hardware could be used for the container sensor apparatus 3 and the delivery sensor apparatus 4 to make the deployment of the necessary hardware of the method the most efficient. Some or no modification may be required to the software of a consolidated sensor apparatus to achieve the performance required in respect of the roles of the container sensor apparatus 3 or the delivery sensor apparatus 4.

Consolidated Sensor Apparatus:

It is specifically contemplated that the most efficient deployment of the hardware and method of the present invention we need to use a consolidated sensor apparatus as both the container sensor apparatus 3 and the delivery sensor apparatus 4. The same type of a sensor hardware device can be used in both applications with modest or no modifications required regarding the software on the sensor apparatus itself.

Figure 3:
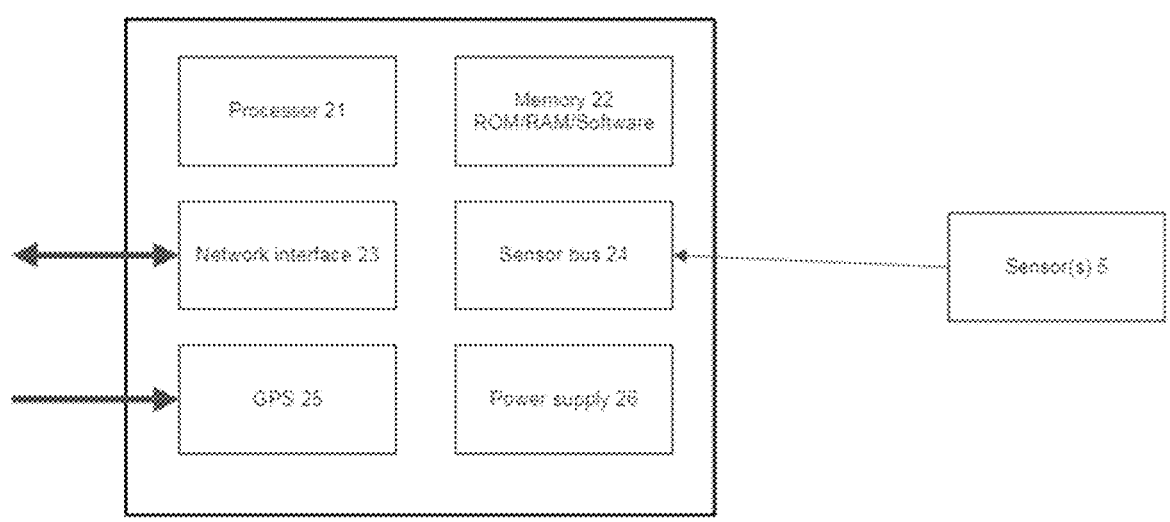
FIG. 3 is a block diagram showing the components of one embodiment of the consolidated sensor apparatus of the invention.

FIG. 3 shows a block diagram demonstrating the key architectural components of one embodiment of a consolidated sensor apparatus which could be used under the remainder of the present invention, in both the role of the container sensor apparatus 3 and the delivery sensor apparatus 4.

The consolidated sensor apparatus in this Figure would likely comprise a self-contained and purpose built sensor interface device for a sensor monitoring method such as outlined herein. It is particularly contemplated that this sensor apparatus would most cost efficiently be produced as a custom manufactured hardware device including the necessary equipment outlined although it will be understood that pre-existing hardware components could also be programmed with an appropriate software interface and approach to achieve the same objective.

The design of freestanding industrial hardware or computer controller such as those shown will be understood to those skilled in the art of hardware design. The consolidated sensor apparatus includes one or more processors 21 which in conjunction with the clock etc. would facilitate the execution of various storing processor instructions in conjunction with the remainder of the method of the present invention. Also shown in the embodiment of this Figure is a memory 22 which would contain BIOS, operating system instructions etc. and a customized set of processor instructions for execution of the aspects of the method of the present invention facilitated by this apparatus used either as the container sensor apparatus 3 or the delivery sensor apparatus. The memory 22 either static or fixed might also include additional processor instructions or storage locations for the storage of processor instructions for the execution of the method or other interim or long-term variables and information to be stored thereon.

Besides the processor 21 and the memory 22 including the various software components associated therewith, the consolidated sensor apparatus splitting a GPS module 25 or other hardware device capable of capturing the geolocation of the consolidated sensor apparatus. The GPS module 25 or similar hardware is shown also in connection to a geolocation network. Many types of geolocation methods and hardware and software systems for accomplishing same will be understood to those skilled in the art and are all contemplated within the scope of the present invention, although a GPS module 25 is the likely most cost efficient means of capturing the geolocation of the device on demand.

The consolidated sensor apparatus also includes at least one network interface 23, explicitly contemplated to likely comprise a cellular modem or the like which would not consume much power and would enable the remote communication of the consolidated sensor apparatus with the server 6 under the remainder of the present invention by a data network. The data network is shown elsewhere in the figures of the specification. The network interface 23 could also comprise other types of radio or transmission and receiving hardware and related software to allow for mobile communication of the consolidated sensor apparatus as instructed or directed by the software and related components thereon in participation in the method of the present invention.

The consolidated sensor apparatus would also require a power supply 26. The power supply could either comprise a connection of the consolidated sensor apparatus to an external power supply 26, or particularly given the desired to render the consolidated sensor apparatus mobile a self-contained power supply 26 could be used. It is particularly contemplated that the hardware of this consolidated sensor apparatus could be manufactured in such a way that not a lot of power requirements existed, so the self-contained power supply 26 such as a battery with a small solar charging panel or the like could cause a self-contained consolidated sensor apparatus that required little to no external power input or attention. It is specifically contemplated that the self-contained power supply approach would be the most desirable one although connect ability of the consolidated sensor apparatus to external power is another obvious approach which could be taken and both are contemplated within the scope.

The key function of the consolidated sensor apparatus would be to allow for the Association of a volume sensor or a sensor capable of taking measurements to be used in calculation of storage or available volume in a container. The sensor bus 24 is shown in the embodiment of this Figure, operatively connected to a sensor 5. As outlined throughout, the consolidated sensor apparatus could either be hardwired to the sensor 5 or the sensor 5 could be provided in an integrated or OEM fashion, or in other embodiments, the consolidated sensor apparatus could simply provide a connection or a sensor bus 24 capable of connection to a pre-existing sensor or sensors on a container which could achieve the method. Both such approaches are again contemplated within the scope.

Figure 2:
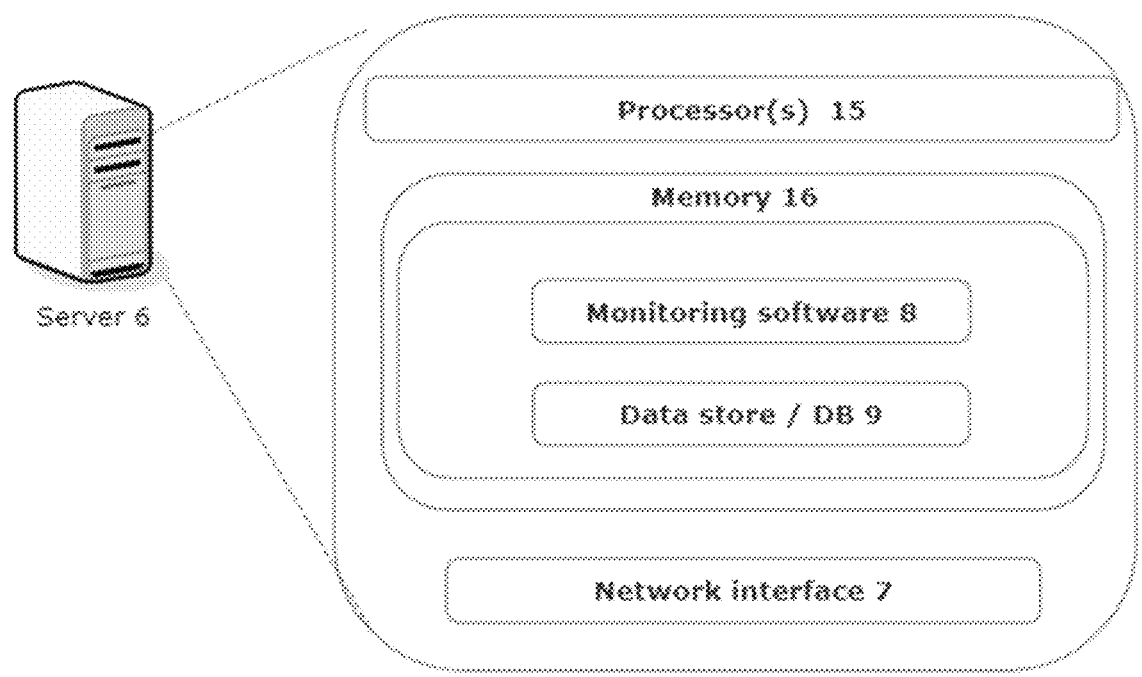
FIG. 2 is a block diagram showing the components of one embodiment of the server of FIG. 1.

The software components operable on the processor 21, besides having the configuration to read and capture values from the local sensors 5 connected to the sensor bus 24 would also be capable of initiating and completing periodic data transmissions via the network interface 23 to the server 6 via at least one connected network, and coordinating the capture of geolocation's of the device via the GPS module and whatever associated locational network was integrated.
Server:

The server 6, a sample embodiment of which is shown in FIG. 2, might consist of one or more servers—a single server or a server farm approach. The server 6 would comprise one or more processors 15 and memory 16. The memory 16 might include various processor instructions for the method of the present invention or otherwise in operating the server 6. Processor instructions corresponding to the monitoring software component 8 are shown stored within the memory 16 in this Figure. The server 6 may be configured by machine-readable instructions, which may include one or more instruction components. The instruction components may include one or more of server firmware or operating systems, the monitoring software component 8, and/or other instruction components.

Memory 16 may comprise non-transitory storage media that electronically stored information. Electronic storage media of memory 16 may include one or both of system storage provided integrally with server 6 and or removable storage that is removably connected to the server 6 via, for example, a port or a drive. Memory 16 may include one or more of optically readable storage media, magnetically readable storage unit electrical charge based storage media, solid-state storage media and or other electronically readable storage media. Memory 16 may include one or more virtual storage resources i.e. cloud storage, a virtual private network or the like. Memory 16 may store software algorithms, information determined by processors 15, information received from servers, information received from user devices 12 and or other information that enables the server 6 to function as described as outlined herein.

The processor 15 may be configured to provide information processing capabilities in the server 6. Processor 15 may include one or more of a digital processor, an analog processor, a digital circuit design and process information, and analog circuit designed to process information, state machine and/or other mechanisms for electronically processing information. Although the processor 15 is shown regarding this Figure as a single entity, in some implementations the processor 15 may include a plurality of processing units which may be physically within the same device, or may represent processing functionality of a plurality of devices operating in coordination.

In many embodiments the server 6 is contemplated to be a Web server 6, where user devices 12 would use a web browser or a locally installed software application for interaction therewith via a network communication or a call. Where a local application was developed, the server 6 might not be a Web server 6 per se but might be a network server 6 capable of interaction with the type of an interface on the remote user devices 12 required to facilitate the operation of that software application. Either such approach is contemplated within the scope.

The server 6 would also be operatively connected to or comprise a database 9. Besides the general operating system instructions, the server 6 would comprise a monitoring software component 8 responsible for execution of the process and method of the present invention at the server 6 and coordinating communication with user devices 12 and the sensor apparatus associated with the remote commodity storage containers and the mobile delivery systems. The monitoring software component 8 might itself act as the interface with the database 9, or the server 6 might include additional software interfaces to the database 9.

The monitoring software component 8 would comprise subroutines to administer the database 9, creating, modifying and processing data transactions and records in the database 9, and any additional financial or numerical transactions, searches for reporting as required. The details of the monitoring software component 8 and its key functionality are outlined elsewhere herein.

Server 6 also requires at least one network interface 7 by which the server 6 could communicate with at least one user device 12, at least one container sensor apparatus 3 and a plurality of delivery sensor apparatus 4.
Server Network Interfaces:

The server 6 includes at least one network interface 7 by which it is a fit to communicate with container sensor apparatus 3, the delivery sensor apparatus 4 and the user devices 12. The particular hardware and software requirements of the network interface of this nature will be understood to those skilled in the art of hardware design and any type of an interface capable of communicating with the necessary number of networks to facilitate this communication are all contemplated within the scope of the present invention.

It is specifically contemplated that the communications network used for communication between the server 6 and the user devices 12 and the sensor apparatus 3, 4 could be the Internet or another publicly available wide-area network. The specific protocol of communication between the devices can vary, and different communication protocols could be used between different devices in the system. All such approaches and architectures will be understood to those skilled in the art of wide-area computer network design and all are contemplated within the scope of the present invention. It will be understood that private networks could also be used in place of the internet albeit with the added cost and complexity in terms of client software communication. Also contemplated is a scenario in which more than one communications network was used i.e. one communications network and a first network interface on the server 6 to communicate with one or more user devices 12 of a particular type, and a separate network interface and/or data network might facilitate communications with sensor apparatus 3,4.

User Devices:

As outlined throughout, the method of the present invention explicitly contemplates the use of network enabled user devices 12 in the dispatch method of the present invention, whereby upon determining the need for a commodity dispatch to or from a particular remote commodity storage container a notification of a particular dispatch requirement could be transmitted to a user associated with a particular selected mobile delivery system. User devices 12 could initiate various types of data transactions with the server and the remainder of the method outlined, and it will be understood by those skilled in the art of client/server application design that any type of a user device 12 which could communicate with the server 6 via at least one data network and a related network interface would be within the scope of the present invention. It is explicitly contemplated that the user devices 12 might comprise smart phones, PCs, tablets or other remote and network capable computing devices, and the scope of the present invention insofar as they will each include a network interface by which the user device 12 could communicate via a data network with the server 6.

The user device 12 may include pre-existing software such as a browser or local application for example, which could facilitate the method of the present invention or in other cases specific purpose built client software could be used. Architecturally and conceptually, the concept of "apps" use of smart phones and other personal devices is widely known. The specifics of implementing the client/server software system using a website or a central bureau and an interface for the user device 12 of users will be easily understood by those skilled in the art of client/server software design and the method of the present invention of implementing such a similar approach is contemplated within the scope of the present invention.

Development of either a browser interface or a local app interface as the user interface between the user of a user device 12 and the server 6 and the monitoring software component 8, along with the remainder of the hosted and executed method, will be understood to those skilled in the art of client/server database and application design and again all such approaches are contemplated within the scope of the present invention.

Monitoring Software Component:

The monitoring software component 8 will generally be understood to be any set of computer processor instructions that will facilitate the execution of the method of the present engine as otherwise outlined. The monitoring software component 8 will, in cooperation and operation with hardware components of the server 6, facilitate the execution of the method such as shown throughout.

The monitoring software component 8 or other software on the server 6 could also provide a user interface by which an administrator or user of the method either by a user device 12 in communication with the servers 6, or otherwise through a device interface could administer, create and edit necessary configurations and records in the database 9 or otherwise—for example to create new container records 10, delivery records 11 or other data housekeeping tasks. Creation of the necessary administrative or reporting interface within the software component 8 will be understood to be within the scope of the present invention.

Figure 4:
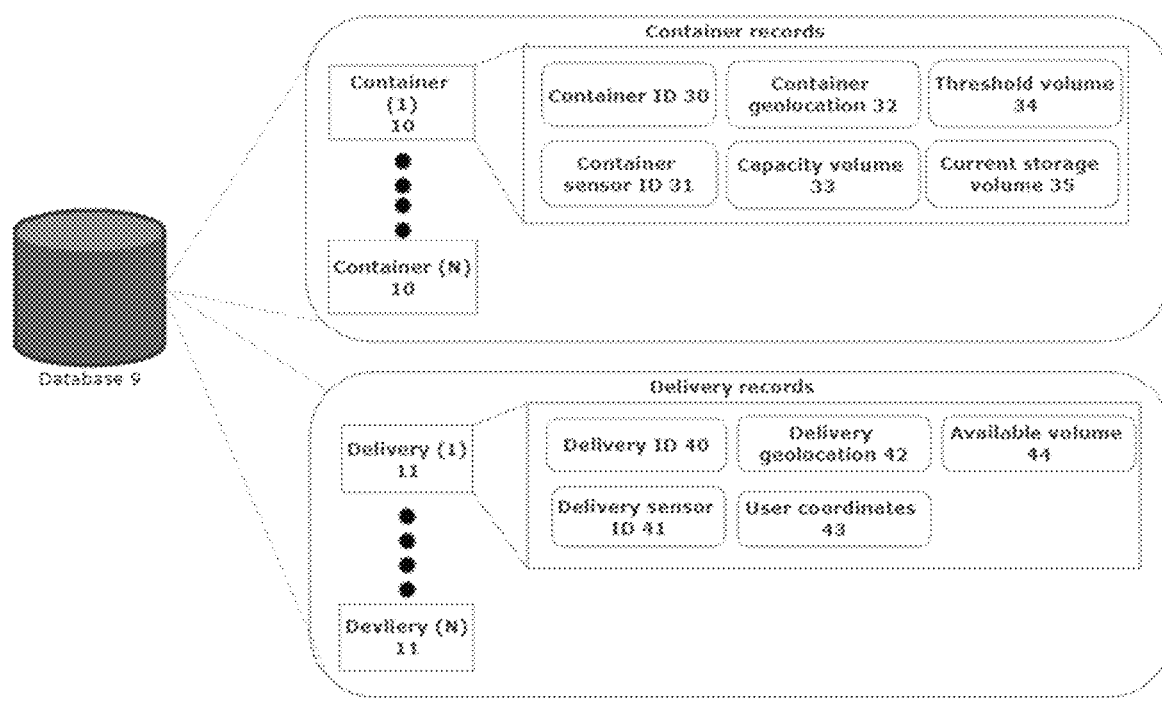
FIG. 4 is a diagram showing a sample of a data structure of the database of the present invention.

Database:

FIG. 4 shows a sample of a basic data structure which could be used by those skilled in the art to understand the general concept of the dataflow and handling of volumes and other mathematical values under the remainder of the present invention. The database 9 comprises at least two sets of records, namely container records 10 each corresponding to a remote commodity storage container 1, and delivery records 11, each corresponding to a mobile delivery system 2. It is effectively contemplated that there would be a container record 10 regarding each remote commodity storage container 1 managed under the method of the present invention and similar that there would be a delivery record 11 regarding each mobile delivery system 2 encompassed within the dispatch method outlined. The data structure shown is merely demonstrative and it will be understood that in terms of the specific nature of the data structure used in the administration of the method of the present invention many types of file structures, data structures be they relational, flat or otherwise are all within the scope of the present invention.

In the sample embodiment of the database 9 shown, the data structure of the container record 10 demonstrated is fairly straightforward. As shown, the record would likely include a record key or a database key of some type, shown as the container ID 30. Additionally as outlined throughout, each remote commodity storage container 1 would be associated with a container sensor apparatus 3 and identifying information or a network address or the like for the associated container sensor apparatus 3 would be stored in the corresponding container record 10, shown as the container sensor ID 31 in this embodiment. Also included is the container geolocation 32, which in some embodiments could be hardcoded or entered in a data interface where the container 1 was permanently installed or not mobile, or in other cases, the method of the present invention can be extended to use regarding mobile remote commodity storage containers 1 by ongoing receiving geolocation updates for recordal to the container record 10 from the associated container sensor apparatus 3. Both such approaches are contemplated within the scope of the present invention.

As outlined elsewhere herein there are at least three volume related values of the related container 1 which typically be stored in the execution of even basic embodiments of the method of the present invention. The capacity volume 33 would be the total volume which it was capable to store of the commodity in question within the related container 1. Effectively this would be the capacity of the container 1. The second value tracked would be the threshold volume 34. The threshold volume 34 would be the volume level at which it was desired to typically trigger the dispatch of a delivery of commodity to or from the remote commodity storage container 1 at its current geolocation. For example if it was desired to never let the stored contents of the container go below one third of the available volume and the container, the threshold volume 34 might be set in proximity of one third of the amount of the capacity volume 33. Finally, the current storage volume 35 is also shown is another field in the record. The current storage volume would be the current stored level of commodity within the container 1 and would be updated each time the transmission was received from the associated container sensor apparatus 3. These are the variables which would be tracked for the execution of the method of the present invention regarding individual remote commodity storage containers 1. It will be understood that additional fields or data could be tracked for reporting or other query purposes in the database 9 and in the related container records 10 and any such further modifications are also contemplated within the scope of the present invention.

Also shown is one embodiment of a delivery record 11 under the method of the present invention. Each delivery record 11 would correspond to a mobile delivery system capable of being dispatched under the adaptive dispatch method of the present invention. The delivery record 11 would again likely include a record key or a database key, shown here is the delivery ID 40. In some database designs the record key 40 could also be another one of the data tokens stored regarding this mobile delivery system in both such approaches will be understood to be within the scope of the present invention.

Besides a record key 40, the delivery record 11 would include a delivery sensor ID 41 which would as outlined throughout comprise identifying information such as a network address or the like for the delivery sensor apparatus 4 associated with the mobile delivery system 2 question. The delivery sensor ID 41 would be the information used to match data transmissions received from the delivery sensor apparatus 4 associated with this mobile delivery system 2 when received. Also shown is a field for the geolocation of the mobile delivery system 42. Also as outlined, the delivery records 11 would include the user coordinates 43 of at least one user device associated with a question. Basically the user coordinates 43 would be the communication coordinates be they network address, telephone number, email address or other information used to address and transmit notifications to a user when it was desired to dispatch the associated mobile delivery system 2 to make a delivery of commodity to or from a particular remote commodity storage container 1. Finally, there is shown a field for the available volume 44 within the mobile delivery system. The available volume would be the commodity available on this mobile delivery system 2 where a delivery to remote commodity storage containers were desired, or free volume within the commodity transport container of the mobile delivery system to where the method is being used to effect the adaptive dispatch of take away volume capacity i.e. where it is desired to transport commodity away from a storage container rather than to its location. As in the case of the container records 10, it will be understood that additional information might be desired to be tracked regarding the mobile delivery system two, the associated delivery sensor apparatus 4 etc. and any additional information to allow extended functionality of the method of the present invention or to allow for using the database 9 in added business functions will be understood to be within the scope.

In certain embodiments of the invention it may be desired to modify the data structure of the database 9 to allow for the storage of individual moment in time volume readings regarding containers are mobile delivery systems, particularly where it was desired to execute a predictive method of determination of the existence of delivery condition at a particular remote storage container. Adaptation of the database approach outlined will be understood to those again skilled in the art of database and software design.

Figure 5:
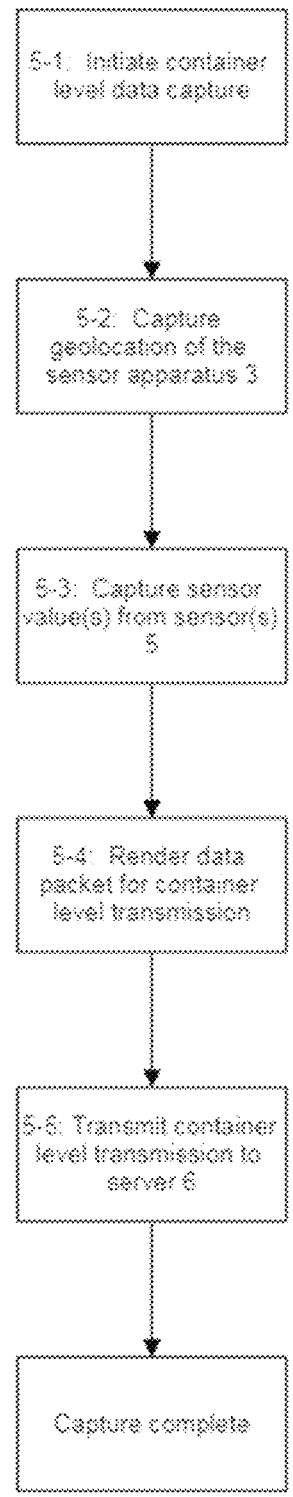
FIG. 5 is a flowchart demonstrating the steps of one embodiment of a container level data capture and transmission transaction by a container sensor apparatus under the method of the present invention.
Figure 6:
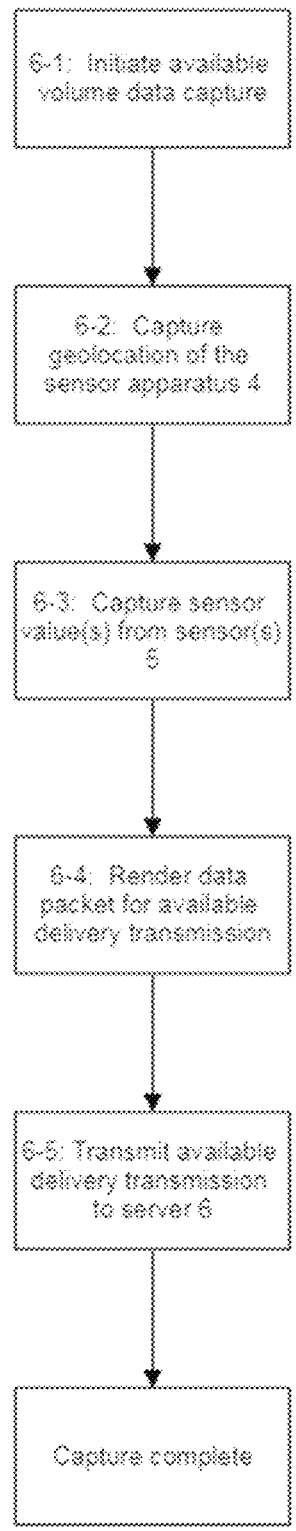
FIG. 6 is a flowchart demonstrating the steps in one embodiment of an availability capture and transmission transaction by a delivery sensor apparatus under the method of the present invention.

Adaptive Dispatch Method:

Referring first to FIGS. 5 and 6 there are shown two precursor routines or methods regarding the container sensor apparatus 3 and the delivery sensor apparatus 4, which will capture and feed periodic volume information to the server 6 for use by the monitoring software component 8 in the execution of the remainder of the steps of the method. The first of these is shown in FIG. 5, being a container level data capture and transmission transaction method to be executed by the hardware and software of a particular container sensor apparatus 3 associated with a remote commodity storage container 1 under the present invention. As outlined throughout, each remote commodity storage container 1 would be associated with a container sensor apparatus 3 having at least one sensor 5 operatively connected thereto capable of capturing measurements which could calculate the current volume stored within the container 1.

The container sensor apparatus 3 would provide periodic container level transmissions to the server 6. These transmissions could be triggered on a preprogrammed time or frequency basis, or the software of the container sensor apparatus 3 could for example on an ongoing monitoring basis trigger the transmission of a container level transmission to the server 6 based upon a particular change in the storage level within the associated container 1 or any number of different types of periodic schedules or programs will be understood to be within the scope of the present invention. In further embodiments of the present invention, the server 6 could pull a periodic container level transmission from the container sensor apparatus 3 by polling or querying the container sensor apparatus 3 by its network interface. Either a push or pull arrangement is conceived to be within the scope of the present invention. Initiating a periodic container level data capture transaction is shown in this Figure and is shown at step 5-1.

Upon initiation of the particular periodic container level data capture and transmission transaction, the first step as shown would be for the container sensor apparatus 3 to capture the geolocation of the present time of the container sensor apparatus 3 and by inference the associated door attached remote commodity storage container 1. The geolocation would be captured by capturing a snap from the GPS or other location interface within the hardware, in an embodiment of the method where the geolocation were captured regarding each container level data capture transaction. As outlined above in certain embodiments of the method of the present invention, the container sensor apparatus 3 may not contain a geolocation interface and the geolocation of the container 1 associated therewith might be hardcoded into the related container record 10 and that will be understood to be encompassed as well although for the method outlined, in the circumstance where both the container sensor apparatus 3 and the delivery sensor apparatus 4 would comprise the same consolidated sensor apparatus including a geolocation interface the capture of the geolocation shown at step 5-2.

The next step in the process would be to sample the sensor or sensors 5 attached to the container sensor apparatus 3 to capture measurements there from which could determine or calculate the current volume level within the container 1. Volume sensors 5 could be used or in other embodiments, different sensors capturing different measurements within the container be used, where the software of the container sensor apparatus 3 or the monitoring software component 8 on the server 6 could translate those captured sensor readings into a rendered and determined current volume for storage in the related container record 10. Capture of the sensor readings is shown at step 5-3.

In the embodiment shown, following the capture of the sensor readings at 5-3, the software of the container sensor apparatus 3 would compile the captured information a data packet representing the container level transmission. Assembly of the data packet is shown at 5-4, and the transmission of the container level transmission from the container sensor apparatus three to the server 6 is shown at step 5-5. It is effectively contemplated that the monitoring software component 8 and other software or hardware components of the server 6 would, on the network interface 7 of the server, have a listener capable of receiving and processing the container level transmission packet.

Similar to the steps of FIG. 5, FIG. 6 shows the steps in one embodiment of a method of the execution of an availability capture and transmission transaction by a delivery sensor apparatus 4 associated with a mobile delivery system 2 of the present invention. Each mobile delivery system 2 would be associated with a delivery sensor apparatus 4 having at least one sensor 5 operatively connected thereto capable of capturing the necessary measurements which could be used to calculate the current availability of the mobile delivery system 2 in question.

The delivery sensor apparatus 4 would provide periodic availability transmissions to the server 6. These transmissions could be triggered on a preprogrammed time frequency basis, or the software of the delivery sensor apparatus 4 could for example on an ongoing basis trigger the transmission of an available capacity transmission to the server 6 based upon a particular change in the available capacity or storage volume remaining within the associated mobile delivery system 2, or several types of periodic schedules or programs could be understood to be within the scope of the present invention. In further embodiments of the present invention, the server 6 could pull a periodic available capacity transmission from one or more of the mobile delivery systems 2 associated with the system and method thereof by polling or querying the delivery sensor apparatus 4 via its network interface. Either a push or pull arrangement is conceived to be encompassed by the invention. Initiating a periodic available volume or capacity capture transaction shown in this Figure and is shown initiated at step 6-1.

Upon initiation of the particular available capacity data capture and transmission transaction the first step is shown would be for the delivery sensor apparatus 4 to capture the geolocation of the present time of the delivery sensor apparatus 4 and by inference the associated or attached mobile delivery system 2. The geolocation would be captured from the GPS or other location interface contained within the hardware of the delivery sensor apparatus 4 or operatively connected thereto. Capture of the geolocation is shown at step 6-2.

Besides capturing the geolocation of the mobile delivery system 2, the next step in this method comprises sampling of the sensor or sensors 5 attached to the delivery sensor apparatus 4 to capture measurements therefrom which could determine or calculate the available delivery volume within mobile delivery system 2. Volume sensors 5 could be used or in other embodiments, different types of sensors capturing different measurements within the container be used, where the software of the delivery sensor apparatus 4 or the monitoring software component 8 could translate those captured sensor readings into a rendered and determined available volume of commodity currently onboard the mobile delivery system and available for delivery in the related delivery record 11. Capture of the sensor readings is shown at step 6-3.

Following capture of the sensor readings, the software of the delivery sensor apparatus and will forward compile the captured information into a data packet representing the availability transmission. Assembly of the data for transmission is shown at 6-4. The transmission of the availability transmission packet from the delivery sensor apparatus 4 to the server 6 is shown at step 6-5. It is effectively contemplated that the monitoring software component 8 and other software or hardware components of the server 6 would, on the network interface 7 of the server, have a listener capable of receiving and processing the availability transmission packet.

Figure 7:
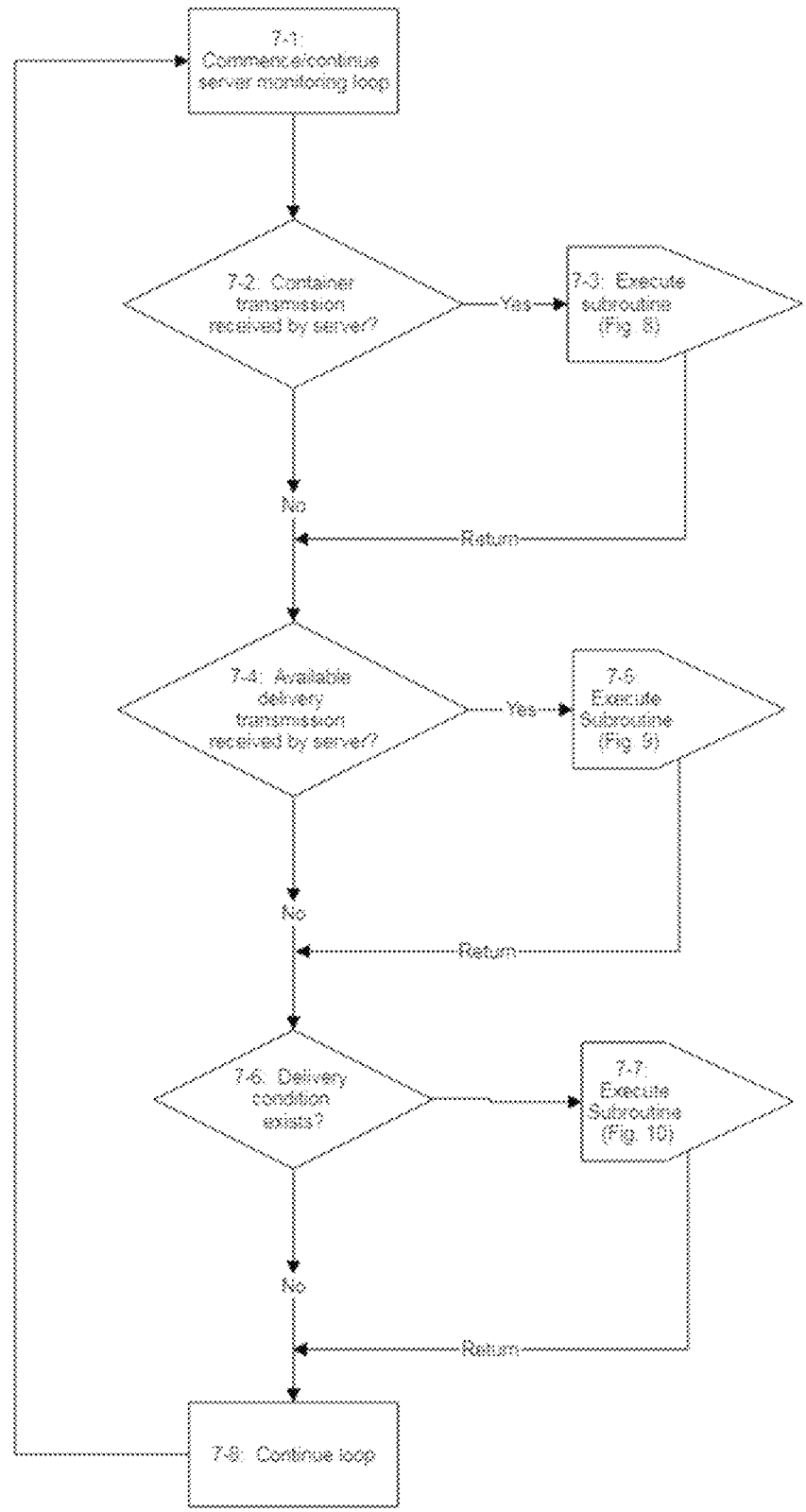
FIG. 7 is a flowchart demonstrating the steps in one embodiment of the overall method of the present invention is executed by the server and the monitoring software component.

As understood from the method of FIGS. 5 and 6, the server 6 via its network interface 7 would occasionally receive container level transmissions and availability transmissions and the server level method outlined in the claims would be executed on this basis. FIG. 7 demonstrates the steps involved in the server-based method of adaptive dispatch of the present invention, based upon receiving such transmissions at a server 6 under the remainder of the outline herein.

Referring to FIG. 7, the method of the present invention is an adaptive delivery or dispatch method for the delivery of commodity to a plurality of remote commodity storage containers 1 from a plurality of mobile delivery systems 2. Effectively, using a consolidated sensor system and a central monitoring server, upon the need for a delivery of commodity to or from a particular remote commodity storage container 1, one or more mobile delivery systems 2 having the capacity to replenish or accommodate the quantity of volume of transport required the dispatch to the location of the remote commodity storage container 1 in question. The method will be facilitated by a monitoring software component 8 hosted upon a server 6, which server communicates with a container sensor apparatus 3 associated with each remote commodity storage container 1, a delivery sensor apparatus 4 associated with each mobile delivery system 2, and user devices 12 associated with the mobile delivery systems 2. The server 6 besides the usual processor hardware and the hardware and software to facilitate a network interface for communication with the devices outlined would also host or be operatively connected to a database 9 as outlined elsewhere herein comprising a container record 10 corresponding to each remote commodity storage container 1 containing data corresponding to at least the identity of the corresponding container sensor apparatus 3 and the geolocation thereof and the capacity volume, the threshold volume, and the current stored volume of the associated remote commodity storage container 1; and a delivery record 11 corresponding to each mobile delivery system 2 containing data corresponding to at least the identity of the corresponding delivery sensor apparatus 4 and the geolocation thereof along with the current available volume of the associated mobile delivery system 2, and communication coordinates for a user device 12 associated therewith.

The monitoring software component 8 would execute the steps of the method of the present invention, as shown in one embodiment in this Figure, by maintaining up-to-date records in the database 9. A flowchart demonstrating the steps of one high-level embodiment of the overarching method of the present invention is shown in FIG. 7. The method of FIG. 7 is effectively a server monitoring loop to be conducted by the server 6 and the monitoring software component 8—the monitoring loop is shown at 7-1. Rather than a monitoring loop it will also be understood to those skilled in the art of software design of applications such as that outlined that there would be other overarching architectures and methodologies that could be used which would achieve the same objective and those are also encompassed within the intentions of this application. Within the monitoring loop 7-1, the monitoring software component 8 would comprise a listener on the network interface 7 of the server 6 which would effectively "listen" for receipt of container volume transmissions or availability transmissions at the server 6 from container sensor apparatus 3 or delivery sensor apparatus 4 in the field and operatively connected to the network interface 7. The activity of such a listener or monitoring loop regarding a container level transmission received by the server 6 is shown at step 7-2. Upon receipt of any container level transmission at the server 6 from a container sensor apparatus 3, the yes leg of the listener loop at 7-2 would be followed and the subroutine of FIG. 8 would be executed as shown at step 7-3. Following the completion of that subroutine, and the logging of the consents of the received container level transmission to the appropriate container record 10 and the database 9, the program would return to the loop of FIG. 7.

Figure 8:
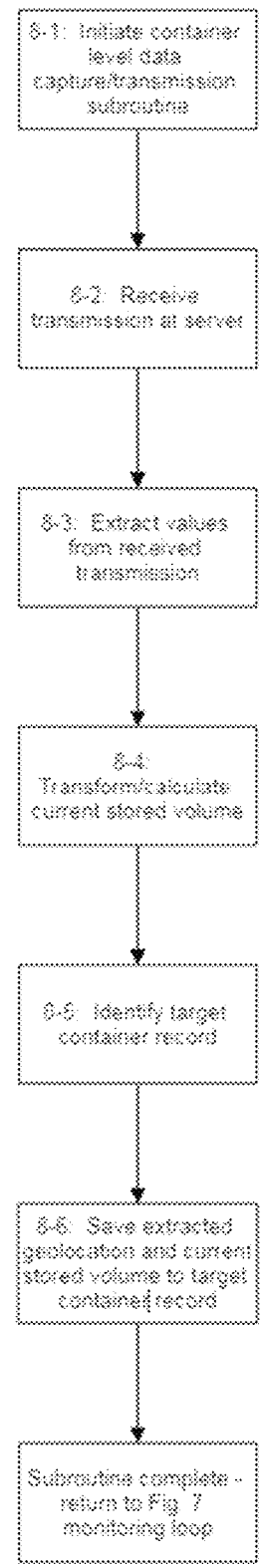
FIG. 8 is a flowchart demonstrating the steps in one embodiment of a capture subroutine related to container level transmissions received at the server, called from the method of FIG. 7.

The subroutine of FIG. 8 outlines the method steps conducted by the monitoring software component 8 regarding the processing and logging of a container level transmission received at the server 6 to the database 9. Initiation of the subroutine is shown at step 8-1—upon receipt of a container level transmission at the server 6 via the network interface 7 and detection of same at 8-2, the data packet or packets of the container level transmission received would be parsed or extracted, to yield the identity or network address of the container sensor apparatus 3 in question, along with the geolocation and the current stored volume in the associated remote commodity storage container. Extraction of the values from the received transmission is shown at 8-3. As outlined elsewhere herein, there are potential embodiments of the method of the present invention and of the container sensor apparatus 3 which would not include a locational awareness or the transmission of a geolocation of the container sensor apparatus and in any particular container level transmission—in such a case, the geolocation of the fixed location remote commodity storage container 1 would be hardcoded into the related container record 10. However as outlined throughout, it is specifically contemplated that in most deployments of a system under the invention and the practice of the method, it is contemplated that the container sensor apparatus 3 and the delivery sensor apparatus 4 would each comprise the same type of a consolidated sensor apparatus or device and in such a case given that the delivery sensor apparatus 4 needs to be locationally aware and be capable of the identity and transmission of the geolocation of the apparatus and its associated mobile delivery system 2, the geolocation ability would also be possible and likely regarding container level transmissions captured from the remote commodity storage containers equipped with such a consolidated container sensor apparatus device 3.

In certain embodiments of the present invention and specifically embodiments of the container sensor apparatus 3, software within the memory of the container sensor apparatus could convert sensor readings captured from the sensor or sensors 5 connected thereto to calculate the current stored volume within the related container before the transmission of that calculated volume result within the data packet or packets of the container level transmission. In other embodiments, such as that shown in FIG. 8, it is contemplated that the sensor readings that might require transformation or calculation to be applied thereto to yield the volume calculation could be transmitted as captured or in a raw format to the server 6 and the container level transmission and could be transformed for the current stored volume calculated based on the nature and type of those sensors and readings by the monitoring software component 8 at the server 6. Transformation of the sensor readings to the current stored volume result by the monitoring software component 8 is shown in this embodiment at step 8-4.

The monitoring software component 8 would identify the target container record 10 being the container record 10 regarding the particular remote commodity storage container 1 associated with the container sensor apparatus 3 having originated the container level transmission, by matching the identity or network address of the container sensor apparatus 3 received within the container level transmission and extracted there from with the identity or network address within the container records 10 of the database 9. Seeking and identifying the target container record is shown as a process step at 8-5.

Following the identification of the target container record 10, the monitoring software component would save the extracted geolocation and current stored volume of the associated remote commodity storage container to the target container record 10—shown at step 8-6, and control following this completion of the subroutine would return to the main monitoring loop in FIG. 7. It will be understood that the steps of the subroutine outlined in FIG. 8 could be conducted in a modified order without departing from the ultimate result and that any such reordering or modification of steps in such a subroutine are also contemplated within the scope of the present invention.

Besides listening for container level transmissions, the monitoring software component 8 would also monitor the network interface or interfaces 7 of the server 6 for receipt of any availability transmissions from delivery sensor apparatus for the field. Upon receiving any availability transmission at the server 6 via the network interface 7, the yes leg of the listener loop shown at 7-4 would be followed in the subroutine of FIG. 9 would be executed as shown at step 7-5. Following the completion of that subroutine and the logging of the contents of the availability transmission received to the appropriate delivery record 11 in the database 9, the program would return to the loop of FIG. 7.

Figure 9:
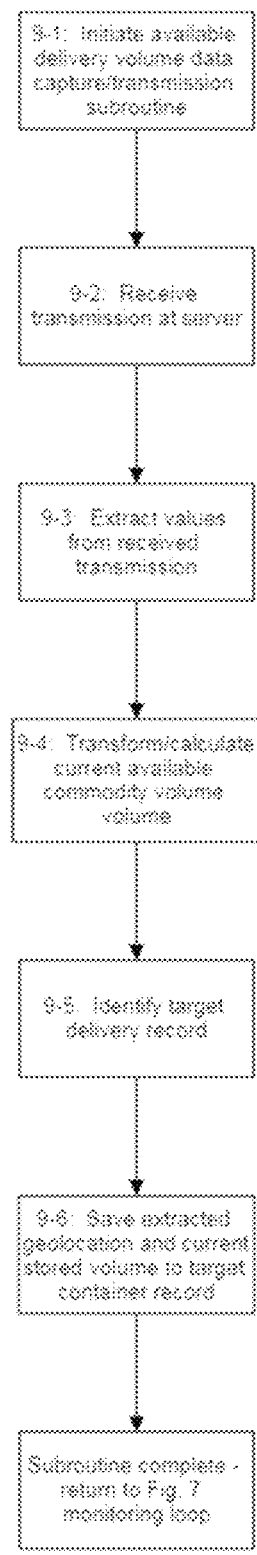
FIG. 9 is a flowchart demonstrating the steps in one embodiment of a capture subroutine related to availability transmissions received at the server, called from the method of FIG. 7.

The subroutine of FIG. 9 outlines the method steps that will acted by the monitoring software component 8 regarding the processing of logging of an available delivery volume transmission received at the server 6 to the database 9. Initiation of the subroutine is shown at step 9-1. Upon receipt of an available volume transmission at the server 6, received from a delivery sensor apparatus 4 based upon the periodic triggering of same, via the network interface 7 of the server and the detection of same at 9-2, the data packet or packets of the available volume transmission received would be parsed or extracted to yield the identity or network address of the delivery sensor apparatus 4 question along with the geolocation and the available delivery volume of the container associated with the associated mobile delivery system 2. Extraction of the values from the received transmission is shown at 9-3.

In some embodiments of the present invention and specifically embodiments of the delivery sensor apparatus 4, software within the memory of the delivery sensor apparatus 4 could convert sensor readings captured from the sensor or sensors 5 connected thereto to calculate the available delivery volume within the related mobile delivery system before the transmission of that calculated available delivery volume result within the available volume transmission. In other embodiments such as that shown in FIG. 9 it is contemplated that the sensor readings captured from the sensors 5 might require transformation or calculation to be applied thereto to yield the volume calculation and could be transmitted as captured or in a raw format to the server 6 where the available volume transmission could be calculated and applied to those sensor readings by the monitoring software component 8. Transformation of the sensor readings to the available delivery volume result by the monitoring software component 8 in this embodiment is shown at step 9-4.

The monitoring software component 8 what identify the target delivery record 11 being the delivery record 11 regarding the particular mobile delivery system 2 associated with delivery sensor apparatus 4 having originated the available volume transmission, by matching the identity or network address of the delivery sensor apparatus 4 received within the available level transmission and extracted there from with the identity or network address within the delivery records 11 of the database 9. Seeking and identifying the target delivery record 11 is shown at step 9-5.

Following the identification of the target delivery record 11, the monitoring software component 8 would save the extracted geolocation and the available delivery volume of the associated mobile delivery system 2 to the target delivery record 11. This is shown at step 9-6, following which the completion of the subroutine would cause return to the main monitoring of FIG. 7. It will be understood that the steps of the subroutine outlined in FIG. 9 could be conducted in a modified order without departing from the ultimate result and that any such reordering or modification of steps in such a subroutine are also contemplated within the scope of the present invention.

Either following the receipt and posting of any container level transmission to the database 9, or on a periodic basis, a monitoring step at step 7-6 would be conducted to ascertain the existence of a delivery condition regarding any remote commodity storage container 1 connected via a container sensor apparatus 3 to the system. Determination of a delivery condition would effectively require the monitoring software component 82 scan the container records 10 and the database 9 and to identify any container records 10 in which the current stored volume most recently received from the associated container sensor apparatus 3 exceeds the threshold volume stored within the record 10—indicating that an action condition exists regarding the container 1 in question in the delivery of commodity to or from that particular remote commodity storage container 1 was required. Any container record 10 satisfying this condition exhibits a delivery condition. Creation of a program instruction or a software subroutine to achieve this database monitoring step, which would consist of scanning the container records 10 and applying the threshold versus current stored volume calculation, will be understood to those skilled in the art of software design and all such approaches are contemplated within the scope of the present invention.

Figure 10:
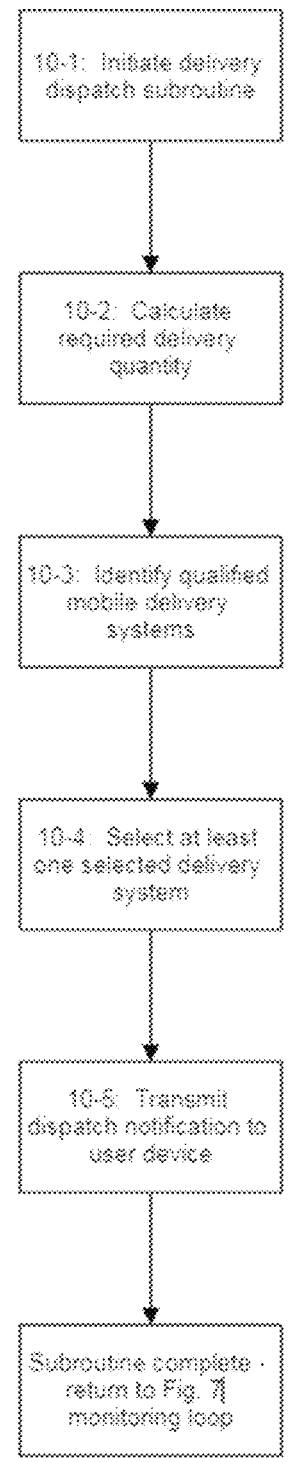
FIG. 10 is a flowchart demonstrating steps in one embodiment of a delivery dispatch subroutine to a remote commodity storage container at which a delivery condition exists, called from the method of FIG. 7.

For any container record 10 regarding which a delivery condition exists, the yes leg of the decision block 7-6 would be followed and the dispatch subroutine of FIG. 10 would be executed as shown at off page subroutine block 7-7. Following the completion of the dispatch subroutine at 7-7, control would return to the overarching loop of FIG. 7.

Determining the existence of a delivery condition by the monitoring software component 8 comprises effectively determining a particular remote commodity storage container 1 regarding which a delivery of commodity to or from that container 1 is required and regarding which one or more mobile delivery systems 2 needs to be dispatched to effect the same. In the delivery dispatch subroutine in FIG. 10, the first step conducted by the server 6 and the monitoring software component 8 is the calculation of the required delivery quantity of commodity to be delivered to or from the remote commodity storage container 1 in question. The required delivery quantity calculation would effectively comprise subtracting the current stored volume within the container from the total volume of the container yielding a difference which is the required delivery quantity. This is shown at 10-2.

Following the calculation of the required delivery quantity, the monitoring software component 8 would identified qualified mobile delivery systems capable of effecting the required dispatch or delivery of commodity to this container 1. In this step, shown at 10-3, the monitoring software component 8 would conduct a scan of the delivery records 11 in the database 9 to identify any delivery records indicating an available delivery volume at least equal or over the required delivery quantity calculated. Effectively this step is identifying any mobile delivery systems via their associated delivery records 11 which contain sufficient volume of commodity or commodity space to allow for a complete delivery to or take away from this container. In some embodiments it is contemplated that the software component 8 and its programming could be modified to allow for the identification of groups of more than one mobile delivery system which could be combined to effect a dispatch or delivery, where no one mobile delivery system 2 had sufficient available volume 2 take on or deliver the complete required quantity but could in combination with another geographically proximate mobile delivery system 2 satisfy the complete need. Both such approaches will be understood to be within the scope of the present invention.

Following the identification of at least one and presumably a plurality of qualified mobile delivery systems 2, each of which are mobile delivery systems 2 corresponding delivery records 11 indicate a sufficient available delivery volume of commodity stored to satisfy the required delivery quantity of a particular container exhibiting a delivery condition, the next step at 10-4 is the selection of at least one selected delivery system which would be dispatched to effect the required delivery of commodity to or from the container in question. In this step, the monitoring software component 8 directly or by interface with external GIS components would identify at least one selected delivery system from those in the group of qualified mobile delivery systems based upon selecting the mobile delivery system 2 which was geographically the closest to the location of the remote commodity storage container 1 requiring delivery. This is the reason that the geolocation of the remote commodity storage containers 1 and the mobile delivery systems 2 are stored in the respective container records 10 and delivery records 11. The details of conducting such a geographic proximity calculation or comparison will be understood to those skilled in the art. In embodiments of the monitoring software component 8 in which a group of mobile delivery systems could be selected to satisfy a larger delivery requirement than anyone mobile delivery system can satisfy, the necessary adjustments could be made to select a plurality of geographically closest mobile delivery systems 2.

Upon selection of at least one selected delivery system to be dispatched for the purpose of making a delivery to satisfy the delivery condition at a particular remote commodity storage container 1, the monitoring software component 8 would use the communication coordinates of a user device associated with selected mobile delivery system 2 which were stored in the associated delivery record 11 to transmit a dispatch notification to that user device. This user device would be the user device of the operator are of a dispatch are of the mobile delivery systems 2 and could contain various types of database information including location details and coordinates, specifics of the required delivery quantity etc. The monitoring software component 8 could also be programmed to allow for effectively the placement of holds unavailable volumes of deliverable commodity regarding particular mobile delivery systems 2 so the mobile delivery system in question 2 did not receive multiple dispatch requests requiring resolution. Following the completion of the dispatch subroutine regarding a particular delivery condition at a particular remote commodity storage container, the subroutine would be completed and control would return to the primary loop of FIG. 7.

Predictive Determination of Delivery Condition:

It is also contemplated that in certain embodiments of the method of the present invention, container volume transmissions initiated by a sensor apparatus 3 to the server 6 could include a timestamp, and the database 9 could be modified to store multiple volume levels in association with timestamps etc. regarding the container associated. This would permit the monitoring software component 8 to be modified to allow for the predictive determination of the delivery condition, wherein by comparison of the timestamps and volume readings associated therewith the monitoring software component 8 could proactively predict the timing of a delivery condition at a particular remote commodity storage container 1 and initiate a dispatch request.

Although the present technology has been described for illustration based on what is considered the most practical and preferred implementations, it is to be understood that such detail is solely for that purpose and that the technology is not limited to the disclosed implementations, but, on the contrary, should cover modifications and equivalent arrangements within the spirit and scope of the appended claims. For example, it is to be understood that the present technology contemplates that, to the extent possible, one or more features of any implementation can be combined with one or more features of any other implementation.

In addition, it will be apparent to those of skill in the art that by routine modification the present invention can be optimized for a wide range of conditions and application. It will also be obvious to those of skill in the art there are various ways and designs with which to produce the apparatus and methods of the present invention. The illustrated embodiments are therefore not intended to limit the invention, but to provide examples of the apparatus and method to enable those of skill in the art to appreciate the inventive concept.

The invention claimed is:

1. A method of adaptive commodity delivery dispatch in a system comprising:
   a. at least one remote commodity storage container for storage of a transportable commodity, said commodity storage container having a capacity volume being the total volume of commodity which can be stored in the commodity storage container and a threshold volume at which a delivery of commodity to or from the commodity storage container is required;
   b. at least one mobile delivery system for delivery of the commodity to or from a commodity storage container, said mobile delivery system comprising a commodity delivery container having a total delivery volume being the total volume of commodity which can be transported in the commodity delivery container;
   c. a container sensor apparatus associated with each remote commodity storage container, said container sensor apparatus capable of capturing the current stored volume of commodity within the associated remote commodity storage container and having a network interface capable of communication with a server;
   d. a delivery sensor apparatus associated with each mobile delivery system, said delivery sensor apparatus capable of capturing the geolocation and the current available volume within the associated mobile delivery system and having a network interface capable of communication with a server;
   e. a server comprising:
      i. a processor;
      ii. a server network interface capable of communication with the at least one container sensor apparatus, the at least one delivery sensor apparatus, and user devices associated with mobile delivery system;
      iii. a database comprising:
         1. a container record corresponding to each remote commodity storage container containing data corresponding to at least the identity of the corresponding container sensor apparatus and the geolocation thereof and the capacity volume, the threshold volume, and the current stored volume of the associated remote commodity storage container; and
         2. a delivery record corresponding to each mobile delivery system containing data corresponding to at least the identity of the corresponding delivery sensor apparatus and the geolocation thereof along with the current available volume of the associated mobile delivery system, and communication coordinates for a user device associated therewith; and
      iv. a monitoring software component for carrying out the steps of the method; the method comprising, using the server and the monitoring software component:
   a. on receipt of any periodic container level transmissions via the server network interface from individual container sensor apparatus, comprising a data packet corresponding to at least the identity of the container sensor apparatus and a recently sampled value for the current stored volume within the associated remote commodity storage container:
      1. extracting the sampled value of the current stored volume of the remote commodity storage container and the identity of the container sensor apparatus from the received packet;
      2. identifying the container record corresponding to the related remote commodity storage container, being the target container record, based on the extracted identity of the container sensor apparatus from which the transmission was received; and 3. saving the extracted current stored volume value from the transmission to the target container record;
b. on receipt of any periodic availability transmissions via the server network interface from individual delivery sensor apparatus, comprising a data packet corresponding to at least the identity and geolocation of the delivery sensor apparatus and a recently sampled value for the current available volume within the associated mobile delivery system:
  i. extracting the sampled value of the geolocation, the current available volume of the mobile delivery system and the identity of the delivery sensor apparatus from the received packet;
  ii. identifying the delivery record corresponding to the related mobile delivery system, being the target delivery record, based on the extracted identity of the delivery sensor apparatus from which the transmission was received; and
  iii. saving the geolocation and the current available volume from the transmission to the target delivery record;
c. periodically scanning the container records in the database to detect any container record indicating a remote commodity storage container regarding which the current stored volume exceeds the threshold volume, being a remote commodity storage container regarding which a delivery condition exists;
d. on detection of the existence of a delivery condition in respect of any remote commodity storage container, being a delivery location, dispatching a mobile commodity delivery thereto by:
  i. calculating the required delivery quantity of commodity required by subtracting the current stored volume from the capacity volume;
  ii. identifying at least one qualified mobile delivery system, being at least one mobile delivery system having the required delivery available volume as indicated in corresponding delivery records, by comparing the delivery records to the calculated required delivery quantity;
  iii. selecting at least one of the qualified mobile delivery systems in closest geographic proximity to the delivery location based upon the geolocation stored in the related container record and the most recent geolocations of each qualified mobile delivery system stored in the related delivery records, being the selected delivery system; and
  iv. transmitting a dispatch notification regarding the selected delivery system to the communication coordinates of the user device associated with the delivery record of the selected delivery system;
wherein the container sensor apparatus and the delivery sensor apparatus each comprise an identical consolidated sensor apparatus with a volume sensor, a geolocation capability and a network interface for communication with a server, configurable by software for use as either the container sensor apparatus or the delivery sensor apparatus of the method.

2. The method of claim 1 wherein the remote commodity storage containers are aggregation containers, in which on-site commodity production is stored, and the commodity delivery required involves transporting commodity from the remote commodity storage container by a selected mobile delivery system for takeaway from the container.

3. The method of claim 1 wherein the remote commodity storage containers are supply containers in which commodity supply is stored for on-site consumption, and the commodity delivery required involves transporting commodity to the remote commodity storage container by a selected mobile delivery system for delivery to the container.

4. The method of claim 1 wherein the number of selected delivery systems dispatched regarding a particular delivery condition is one.

5. The method of claim 1 wherein the number of selected delivery system dispatched regarding a particular delivery condition more than one, so the available volume of each selected delivery system when aggregated will satisfy the required delivery quantity of the specific remote commodity storage container.

6. The method of claim 1 wherein at least one remote commodity storage container is mobile and the associated container sensor apparatus is capable of capturing its geolocation, and the sensor capture by the related container sensor apparatus and subsequent container level transmission includes current capture of the geolocation of the remote commodity storage container, wherein the geolocation of the corresponding container record is updated during the extraction and storing of the contents of the container level transmission.

7. The method of claim 1 wherein container level transmissions transmitted from container sensor apparatus include timestamps of the related sensor capture contained therein, and the database and the container records associated therewith are adapted to store multiple current stored volume values regarding the related remote commodity storage container in association with said timestamps, whereby the monitoring software component can predictably determine the existence of a delivery condition at a particular time regarding a particular remote commodity storage container based upon predicting the current stored volume value in the container based upon the time and stored volume curve established by multiple previously captured timestamp and volume values.

8. The method of claim 1 wherein the volume sensor is an integrated sensor for use in capturing the current stored volume within the associated remote commodity storage container or the available volume within the associated mobile delivery system.

9. The method of claim 1 wherein the volume sensor is a sensor bus for connection to a pre-existing sensor on the container for use in capturing the current stored volume within the associated remote commodity storage container or the available volume within the associated mobile delivery system.

10. The method of claim 1 wherein the consolidated sensor apparatus includes a self-contained long-term power supply, not requiring external power input.

11. The method of claim 1 wherein the consolidated sensor apparatus is connectible to an external power supply.

12. The method of claim 1 wherein the network interface of the consolidated sensor apparatus is a cellular modem connected to a cellular data network.

13. A server for use in a method of adaptive commodity delivery dispatch regarding at least one remote commodity storage container having a capacity volume being the total amount of commodity which can be stored in the storage container and a threshold volume at which a delivery of commodity to or from the commodity storage container is required, and at least one mobile delivery system for delivery of the commodity to or from a commodity storage container and comprising a commodity delivery container, said server comprising:

a. processor;
b. a server network interface capable of communication with:
   i. a container sensor apparatus associated with each remote commodity storage container;
   ii. a delivery sensor apparatus associated with each mobile delivery system; and
   iii. user devices associated with mobile delivery systems;
c. a database comprising:
   i. a container record corresponding to each remote commodity storage container containing data corresponding to at least the identity of the corresponding container sensor apparatus and the geolocation thereof and the capacity volume, the threshold volume, and the current stored volume of the associated remote commodity storage container; and
   ii. a delivery record corresponding to each mobile delivery system containing data corresponding to at least the identity of the corresponding delivery sensor apparatus and the geolocation thereof along with the current available volume of the associated mobile delivery system, and communication coordinates for a user device associated therewith; and
d. a monitoring software component for carrying out the steps of the method by:
   a. on receipt of any periodic container level transmissions via the server network interface from individual container sensor apparatus, comprising a data packet corresponding to at least the identity of the container sensor apparatus and a recently sampled value for the current stored volume within the associated remote commodity storage container:
      i. extracting the sampled value of the current stored volume of the remote commodity storage container and the identity of the container sensor apparatus from the received packet;
      ii. identifying the container record corresponding to the related remote commodity storage container, being the target container record, based on the extracted identity of the container sensor apparatus from which the transmission was received; and
      iii. saving the extracted current stored volume value from the transmission to the target container record;
   e. on receipt of any periodic availability transmissions via the server network interface from individual delivery sensor apparatus, comprising a data packet corresponding to at least the identity and geolocation of the delivery sensor apparatus and a recently sampled value for the current available volume within the associated mobile delivery system:
      i. extracting the sampled value of the geolocation, the current available volume of the mobile delivery system and the identity of the delivery sensor apparatus from the received packet;
      ii. identifying the delivery record corresponding to the related mobile delivery system, being the target delivery record, based on the extracted identity of the delivery sensor apparatus from which the transmission was received; and
      iii. saving the geolocation and the current available volume from the transmission to the target delivery record;
   f. periodically scanning the container records in the database to detect any container record indicating a remote commodity storage container regarding which the current stored volume exceeds the threshold volume, being a remote commodity storage container regarding which a delivery condition exists;
   g. on detection of the existence of a delivery condition in respect of any specific remote commodity storage container, being a delivery location, dispatching at least one mobile commodity delivery thereto by:
      i. calculating the required delivery quantity of commodity required by subtracting the current stored volume from the capacity volume;
      ii. identifying at least one qualified mobile delivery system, being at least one mobile delivery system having the required delivery available volume as indicated in corresponding delivery records, by comparing the delivery records to the calculated required delivery quantity;
      iii. selecting at least one of the qualified mobile delivery systems in closest geographic proximity to the delivery location based upon the geolocation stored in the related container record and the most recent geolocations of each qualified mobile delivery system stored in the related delivery records, being the selected delivery system; and
      iv. transmitting a dispatch notification regarding the selected delivery system to the communication coordinates of the user device associated with the delivery record of the selected delivery system;
   wherein container level transmissions transmitted from container sensor apparatus include timestamps of the related sensor capture contained therein, and the database and the container records associated therewith are adapted to store multiple current stored volume values regarding the related remote commodity storage container in association with said timestamps, whereby the monitoring software component can predictably determine the existence of a delivery condition at a particular time regarding a particular remote commodity storage container based upon predicting the current stored volume value in the container based upon the time and stored volume curve established by multiple previously captured timestamp and volume values.

14. The server of claim 13 wherein the remote commodity storage containers are aggregation containers, in which on-site commodity production is stored, and the commodity delivery required involves transporting commodity from the remote commodity storage container by a selected mobile delivery system for takeaway from the container.

15. The server of claim 13 wherein the remote commodity storage containers are supply containers in which commodity supply is stored for on-site consumption, and the commodity delivery required involves transporting commodity to the remote commodity storage container by a selected mobile delivery system for delivery to the container.

16. The server of claim 13 wherein at least one remote commodity storage container is mobile and the associated container sensor apparatus can capture its geolocation, and the sensor capture by the related container sensor apparatus and subsequent container level transmission includes current capture of the geolocation of the remote commodity storage container, wherein the geolocation of the corresponding container record is updated during the extraction and storing of the contents of the container level transmission.

17. The consolidated sensor apparatus of claim 1.

* * * * *